United States Patent
Toda et al.

(10) Patent No.: US 11,028,458 B2
(45) Date of Patent: Jun. 8, 2021

(54) STEEL SHEET AND PLATED STEEL SHEET

(71) Applicant: NIPPON STEEL CORPORATION, Tokyo (JP)

(72) Inventors: Yuri Toda, Tokyo (JP); Masafumi Azuma, Tokyo (JP); Akihiro Uenishi, Tokyo (JP); Eisaku Sakurada, Tokyo (JP); Tatsuo Yokoi, Tokyo (JP); Genichi Shigesato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/481,291

(22) PCT Filed: Jan. 27, 2017

(86) PCT No.: PCT/JP2017/003023
§ 371 (c)(1),
(2) Date: Jul. 26, 2019

(87) PCT Pub. No.: WO2018/138887
PCT Pub. Date: Aug. 2, 2018

(65) Prior Publication Data
US 2019/0338389 A1 Nov. 7, 2019

(51) Int. Cl.
| | |
|---|---|
| *C21D 9/46* | (2006.01) |
| *C22C 38/42* | (2006.01) |
| *C22C 38/14* | (2006.01) |
| *C22C 38/12* | (2006.01) |
| *C22C 38/06* | (2006.01) |
| *C22C 38/04* | (2006.01) |
| *C22C 38/02* | (2006.01) |
| *C22C 38/00* | (2006.01) |
| *B32B 15/01* | (2006.01) |
| *C21D 8/02* | (2006.01) |
| *C21D 6/00* | (2006.01) |
| *B21B 3/02* | (2006.01) |
| *B21B 1/02* | (2006.01) |

(52) U.S. Cl.
CPC ............ *C21D 9/46* (2013.01); *B21B 1/02* (2013.01); *B21B 3/02* (2013.01); *B32B 15/01* (2013.01); *C21D 6/004* (2013.01); *C21D 6/005* (2013.01); *C21D 6/008* (2013.01); *C21D 8/0205* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/42* (2013.01); *B21B 2001/028* (2013.01)

(58) Field of Classification Search
CPC ....... B21B 1/02; B21B 2001/028; B21B 3/02; B32B 15/01; C21D 6/004; C21D 6/005; C21D 6/008; C21D 8/0205; C21D 8/0263; C21D 9/46; C22C 38/00; C22C 38/001; C22C 38/002; C22C 38/005; C22C 38/008; C22C 38/02; C22C 38/04; C22C 38/06; C22C 38/12; C22C 38/14; C22C 38/42; C22C 38/58
See application file for complete search history.

(56) References Cited

U.S. PATENT DOCUMENTS

| | | | |
|---|---|---|---|
| 4,913,746 A * | 4/1990 | Marder | C25D 5/50 148/503 |
| 2013/0087254 A1 | 4/2013 | Funakawa et al. | |
| 2015/0218708 A1 | 8/2015 | Maruyama et al. | |
| 2016/0130680 A1 | 5/2016 | Kawasaki et al. | |

(Continued)

FOREIGN PATENT DOCUMENTS

| | | |
|---|---|---|
| JP | 8-302426 A | 11/1996 |
| JP | 2006-274318 A | 10/2006 |

(Continued)

OTHER PUBLICATIONS

First Office Action for TW 106103507 dated Apr. 12, 2018.

(Continued)

*Primary Examiner* — Jenny R Wu
(74) *Attorney, Agent, or Firm* — Birch, Stewart, Kolasch & Birch, LLP

(57) ABSTRACT

When a zone surrounded by a grain boundary that is measured to be 5.0° or more by an EBSD analysis is assumed to be a grain, and when a K value is a value obtained by multiplying an average value of Image Qualities in a grain by $10^{-3}$, a Y value is an average crystal misorientation (°) in the grain, a metallic phase 1 is a metallic phase the K value of which is less than 4.000, a metallic phase 2 is a metallic phase the K value of which is 4.000 or more and the Y value of which is 0.5 to 1.0, a metallic phase 3 is a metallic phase the K value of which is 4.000 or more and the Y value of which is less than 0.5, and a metallic phase 4 is a metallic phase that falls under none of metallic phases 1 to 3, there is provided a steel sheet that has a predetermined chemical composition and includes a microstructure including, in area percent, a metallic phase 1: 1.0% or more and less than 35.0%, a metallic phase 2: 30.0% or more and 80.0% or less, a metallic phase 3: 5.0% or more and 50.0% or less, and a metallic phase 4: 5.0% or less. The steel sheet has a strength as high as 590 MPa or more (further, 780 MPa or more) in terms of tensile strength and has an excellent hole-expansion property.

19 Claims, 1 Drawing Sheet

(56) References Cited

U.S. PATENT DOCUMENTS

| | | |
|---|---|---|
| 2016/0273066 A1 | 9/2016 | Sakakibara et al. |
| 2018/0023160 A1 | 1/2018 | Minami et al. |
| 2018/0037980 A1* | 2/2018 | Wakita .................... C22C 38/46 |
| 2018/0044749 A1* | 2/2018 | Shuto ...................... C21D 6/008 |

FOREIGN PATENT DOCUMENTS

| | | |
|---|---|---|
| JP | 2011-184788 A | 9/2011 |
| JP | 2011-195956 A | 10/2011 |
| JP | 2011-225941 A | 11/2011 |
| JP | 2012-26032 A | 2/2012 |
| JP | 2013-181208 A | 9/2013 |
| JP | 2014-141703 A | 8/2014 |
| TW | 201641714 A | 12/2016 |
| WO | WO 2014/185405 A1 | 11/2014 |
| WO | WO 2016/125463 A1 | 8/2016 |
| WO | WO 2016/132549 A1 | 8/2016 |
| WO | WO 2016/133222 A1 | 8/2016 |
| WO | WO-2016132549 A1 * | 8/2016 ............. C22C 38/50 |
| WO | WO-2016135896 A1 * | 9/2016 ............... C21D 9/46 |

OTHER PUBLICATIONS

International Search Report for PCT/JP2017/003023 dated Mar. 21, 2017.

Kato et al., Yawata Technical Report, 1984, vol. 312, pp. 41-50, total 11 pages.

Kitajima et al., "Characterization methods of complex ferritic microstructures using Electron Channeling Contrast image", CAMP-ISIJ, Sep. 1, 2013, vol. 26, No. 2, p. 896, total 3 pages.

Written Opinion of the International Searching Authority for PCT/JP2017/003023 (PCT/ISA/237) dated Mar. 21, 2017.

* cited by examiner

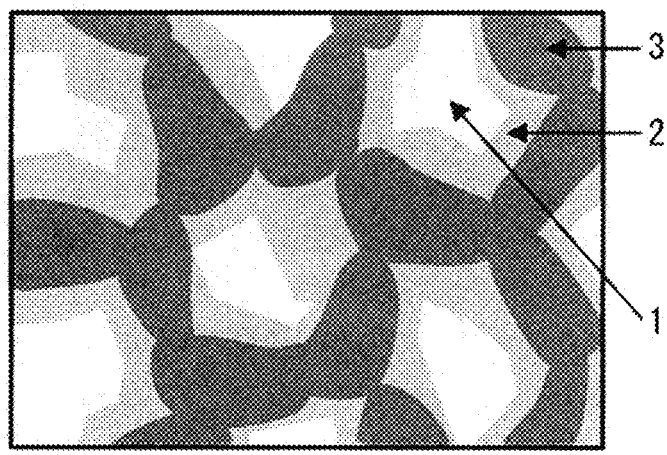

STEEL SHEET AND PLATED STEEL SHEET

TECHNICAL FIELD

The present invention relates to a steel sheet and a plated steel sheet.

BACKGROUND ART

In recent years, many high tensile strength steel sheets are used in an automobile. This is to meet a demand for improvement of fuel consumption resulting from weight reduction in order to reduce carbon dioxide gas emissions and to meet a demand for a body of a vehicle that absorbs collision energy in a collision to ensure protection/safety of passengers.

Typically, when a strength of a steel sheet is increased, however, its formability deteriorates. This therefore degrades elongation necessary for draw forming or bulging as well as hole-expansion property necessary for workability in burring. Hence, various techniques for establishing compatibility between strength increase, and elongation or hole-expansion property have been proposed (e.g., see Patent Documents 1 to 9).

For example, JP2006-274318A (Patent Document 1) and JP2013-181208A (Patent Document 2) disclose techniques to ensure a high elongation even for a high tensile strength steel sheet by making a steel micro-structure of the steel sheet into a complex microstructure of ferrite, which is a soft structure, and bainite, which is a hard structure.

JP 2011-225941A (Patent Document 3) discloses a technique for establishing compatibility between strength and elongation by controlling precipitation distribution through a precipitation phenomenon (interphase boundary precipitation) that is caused mainly by grain boundary diffusion occurring in a interphase boundary in transformation from austenite into ferrite, so as to form precipitation-strengthened ferrite as a main phase.

JP2012-026032A (Patent Document 4) discloses a technique for establishing compatibility between strength and elongation by forming a steel sheet micro-structure into a single phase structure of ferrite and by strengthening the ferrite with a fine carbide.

JP2011-195956A (Patent Document 5) discloses a technique for ensuring elongation and hole-expansion property in a high tensile strength thin steel sheet by producing 50% or more of austenite grains having a required C concentration in boundaries between an austenite grain and a ferritic phase, a bainitic phase, and a martensite phase.

JP2014-141703A (Patent Document 6) and JP2011-184788A (Patent Document 7) disclose techniques for ensuring a high elongation even for a high tensile strength steel sheet by making a steel micro-structure of the steel sheet into a complex microstructure of ferrite, which is a soft structure, and martensite, which is a hard structure.

JP2011-195956A (Patent Document 8) and WO 2014/185405 (Patent Document 9) disclose techniques for improving a hole-expansion property by reducing differences in hardness between structures by forming a steel micro-structure of a steel sheet into ferrite, bainite, and martensite. WO 2016/132549 (Patent Document 10) and WO 2016/133222 (Patent Document 11) disclose techniques for ensuring stretch flangeability, notched fatigue properties, and corrosion resistance after coating even for a high tensile strength steel sheet by forming a steel micro-structure of the steel sheet into ferrite, bainite, and martensite, and setting a proportion of grains having misorientations of 5 to 14° at 10 to 60% in terms of area fraction.

With regard to the enhancement of hole-expansion property, Non-Patent Document 1 discloses that a hole-expansion property is enhanced by reducing differences in hardness between structures by forming a single phase.

LIST OF PRIOR ART DOCUMENTS

Patent Document

Patent Document 1: JP2006-274318A
Patent Document 2: JP2013-181208A
Patent Document 3: JP2011-225941A
Patent Document 4: JP2012-026032A
Patent Document 5: JP2011-195956A
Patent Document 6: JP2014-141703A
Patent Document 7: JP2011-184788A
Patent Document 8: JP2011-195956A
Patent Document 9: WO 2014/185405
Patent Document 10: WO 2016/132549
Patent Document 11: WO 2016/133222

Non Patent Document

Non-Patent Document 1: Kato, et al., Yawata technical report (1984) vol. 312, p. 41

SUMMARY OF INVENTION

Technical Problem

In the techniques disclosed in Patent Document 1 and Patent Document 2, each of their steel sheet micro-structures is a complex microstructure including a soft structure and a hard structure, and a boundary between the soft structure and the hard structure fosters development of a crack in hole expansion.

In the techniques disclosed in Patent Document 3 and Patent Document 4, precipitates of hard structures dispersed in a soft structure serves as a starting point of a crack in hole expansion; therefore, it is difficult for both of the techniques to establish compatibility among strength, elongation, and hole-expansion property.

The technique disclosed in Patent Document 5 can ensure an excellent elongation and an excellent hole-expansion property but has a difficulty in controlling structures.

The techniques disclosed in Patent Document 6 and Patent Document 7 yield large differences in hardness between a soft structure and a hard structure, which cause a boundary between these structures to foster development of a crack, resulting in poor hole-expansion properties.

In the techniques disclosed in Patent Document 8, Patent Document 9, Patent Document 10, and Patent Document 11, a crack occurs from an inside of bainite in hole expansion, resulting in a low possibility of improving the hole-expansion property. This is because cementite included in the bainite serves as a starting point of the crack.

Regarding to the technique disclosed in Non-Patent Document 1, it is difficult to apply conditions for forming a single phase to an industrial-scale producing process of a hot-rolled steel sheet, and the technique still has a problem in strength increase.

The present invention has an objective to provide a steel sheet and a plated steel sheet that has a strength as high as 590 MPa or more in terms of tensile strength and has an excellent hole-expansion property.

Solution to Problem

To solve the problem described above, the present inventors conducted intensive studies about design guidelines and a producing method for a microstructure that enables enhancement in hole-expansion property while ensuring ductility enhancement brought by a soft structure (ferrite) and strength increase brought by a hard structure (martensite), in a dual phase (DP) steel having a tensile strength of 590 MPa or more. Through a process of these studies, the present inventors successfully developed a steel sheet that has an excellent hole-expansion property while maintaining a tensile strength of 590 Ma or more and an excellent ductility. The present inventors investigated a structural feature of the developed steel, and a result of the investigation shows that a microstructure of the steel included a metallic phase 1 to a metallic phase 3, which is defined based on indices, a K value and a Y value, and that production of a structure equivalent to upper bainite, lower bainite, pearlite, cementite, and retained austenite, which is included in a conventional DP steel (and this structure is equivalent also to a metallic phase 4 described later) was inhibited. That is, it was found that when an existence form of the metallic phase 1 to the metallic phase 3 can be controlled by optimizing production conditions, it is possible to increase hole-expansion property significantly while maintaining a high tensile strength and a high ductility.

The summaries of the present invention are as follows.

(1) A steel sheet including
a chemical composition consisting of, in mass percent:
C: 0.01 to 0.20%;
Si: 0.005 to 0.10%;
Mn: 0.60 to 4.00%;
Al: 0.10 to 3.00%;
P: 0.10% or less;
S: 0.03% or less;
N: 0.01% or less;
0: 0.01% or less;
Ti: 0 to 2.00%;
Nb: 0 to 2.00%;
V: 0 to 0.30%;
Cu: 0 to 2.00%;
Ni: 0 to 2.00%;
Mo: 0 to 1.00%;
Cr: 0 to 2.00%;
B: 0 to 0.01%;
Ca: 0 to 0.010%;
Mg: 0 to 0.010%;
Zr: 0 to 0.050%;
REM: 0 to 0.1%;
Sb: 0 to 0.10%;
Sn: 0 to 0.10%; and
As: 0 to 0.5%,
with the balance: Fe and impurities, and including
a microstructure that includes,
when a zone surrounded by a grain boundary that is measured to be 5.0° or more by an EBSD analysis is assumed to be a grain, and when
a K value is a value obtained by multiplying an average value of Image Qualities in a grain by $10^{-3}$,
a Y value is an average crystal misorientation (°) of the grain,
a metallic phase 1 is a metallic phase the K value of which is less than 4.000,
a metallic phase 2 is a metallic phase the K value of which is 4.000 or more and the Y value of which is 0.5 to 1.0,
a metallic phase 3 is a metallic phase the K value of which is 4.000 or more and the Y value of which is less than 0.5, and
a metallic phase 4 is a metallic phase that falls under none of metallic phases 1 to 3, in area percent:
the metallic phase 1: 1.0% or more and less than 35.0%;
the metallic phase 2: 30.0% or more and 80.0% or less;
the metallic phase 3: 5.0% or more and 50.0% or less; and
the metallic phase 4: 5.0% or less.

(2) The steel sheet according to the above (1), wherein microstructure includes the metallic phase 4 of 0%.

(3) The steel sheet according to the above (1) or (2), wherein 60.0% or more of boundaries of the metallic phase 1 with other metallic phases is a boundary of the metallic phase 1 with the metallic phase 2

(4) The steel sheet according to any one of the above (1) to (3), wherein a thickness of the steel sheet is 0.8 to 3.6 mm.

(5) The steel sheet according to any one of the above (1) to (4), wherein the steel sheet has a tensile strength of 780 MPa or more, and includes a microstructure including, in area percent;
the metallic phase 1: 1.0% or more and less than 35.0%;
the metallic phase 2: 30.0% or more and 80.0% or less;
the metallic phase 3: 5.0% or more and less than 35.0%; and
the metallic phase 4: 5.0% or less.

(6) The steel sheet according to any one of the above (1) to (4), wherein
the steel sheet has a tensile strength of 590 MPa or more and less than 780 MPa, and includes a microstructure including:
the metallic phase 1: 1.0% or more and less than 30.0%;
the metallic phase 2: 35.0% or more and 70.0% or less;
the metallic phase 3: 35.0% or more and 50.0% or less;
the metallic phase 4: 5.0% or less.

(7) A plated steel sheet including a galvanized layer on a surface of the steel sheet according to any one of above (1) to (6).

(8) A plated steel sheet including a galvannealed layer on a surface of the steel sheet according to any one of above (1) to (6).

Advantageous Effects of Invention

According to the present invention, a steel sheet and a plated steel sheet that has a strength as high as 590 MPa or more (furthermore, 780 MPa or more) in terms of tensile strength and has an excellent hole-expansion property are provided.

BRIEF DESCRIPTION OF DRAWINGS

FIG. 1 is a diagram schematically illustrating an example of a microstructure.

DESCRIPTION OF EMBODIMENTS

1. Chemical Composition

A chemical composition of a steel sheet according to the present invention will be described. In the following description, the symbol "%" for contents means "percent by mass."

C: 0.01 to 0.20%

C (carbon) is an element necessary to obtain a predetermined amount of a metallic phase 1. When C is less than 0.01%, it is difficult to set the predetermined amount of the metallic phase 1 at 1.0% or more in terms of area fraction. Accordingly, a lower limit of C is set at 0.01%. To increase the area fraction of metallic phase 1, the lower limit may be set at 0.03% or more, 0.04% or more, or 0.05% or more.

In contrast, when C is added excessively, it is difficult to set the metallic phase 1 at 1.0% or more in terms of area fraction. Accordingly, an upper limit of C is set at 0.20%. To increase the area fraction of metallic phase 1, the upper limit may be set at 0.10% or less, 0.08% or less, 0.07% or less, or 0.06% or less.

Si: 0.005 to 0.10%

Si (silicon) is an element necessary to obtain a predetermined amount of a metallic phase 3. When Si is less than 0.005%, it is difficult to obtain the predetermined amount of the metallic phase 3. Accordingly, a lower limit of Si is set at 0.10%. To increase the area fraction of metallic phase 3, the lower limit may be set at 0.015% or more, 0.020% or more, 0.025% or more, or 0.030% or more.

In contrast, when Si is added excessively, the area fraction of the metallic phase 3 becomes excessively high, which makes it difficult to set the metallic phase 1 at 1.0% or more in terms of area fraction. Accordingly, an upper limit of Si is set at 0.10%. To optimize the area fractions of metallic phase 1 and the metallic phase 3, the upper limit may be set at 0.060% or less, 0.050% or less, or 0.040% or less.

Mn: 0.60 to 4.00%

Mn (manganese) is an element necessary to obtain the predetermined amount of a metallic phase 1. When Mn is less than 0.60, it is difficult to set the metallic phase 1 at 1.0% or more in terms of area fraction. Accordingly, a lower limit of Mn is set at 0.60%. The lower limit is preferably 0.60% or more, more preferably 0.90% or more, still more preferably 1.10% or more, and still more preferably 1.30% or more.

In contrast, when Mn is added excessively, it is difficult to set the metallic phase 1 at 1.0% or more in terms of area fraction. Accordingly, an upper limit of Mn is set at 4.00%. The upper limit is preferably 3.00% or less, more preferably 2.50% or less, still more preferably 2.00% or less, and still more preferably 1.80% or less.

Al: 0.10 to 3.00%

Al (aluminum) is an element necessary to obtain a predetermined amount of a metallic phase 3. When Al is less than 0.10%, it is difficult to obtain the predetermined amount of the metallic phase 3. Accordingly, a lower limit of Al is set at 0.10%. The lower limit is preferably 0.20% or more, more preferably 0.30% or more, still more preferably 0.40% or more, and still more preferably 0.55% or more.

In contrast, when Al is added excessively, the area fraction of the metallic phase 3 becomes high, which makes it difficult to set the metallic phase 1 at 1.0% or more in terms of area fraction. Accordingly, an upper limit of Al is set at 3.00%. The upper limit is preferably 2.00% or less, more preferably 1.50% or less, still more preferably 1.00% or less, and still more preferably 0.80% or less.

P: 0.10% or less

P is an impurity element and spoils the hole-expansion property by precipitating in grain boundaries and forming a coarse phosphide. When P is more than 0.10%, the precipitation becomes significant; therefore, P is limited to 0.10% or less. Preferably, P is 0.02% or less. The lower P is, the better it is; a lower limit of P need not be limited particularly, and the lower limit is 0%. However, reducing the lower limit to less than 0.0001% is economically disadvantageous, and therefore 0.0001% may be set as the lower limit.

S: 0.03% or less

S (sulfur) is an impurity element and spoils the hole-expansion property by forming a coarse sulfide. When S is more than 0.03%, sulfides are formed excessively, making a deterioration in the hole-expansion property significant; therefore, S is limited to 0.03% or less. More preferably, S is 0.005% or less. The lower S is, the better it is; a lower limit of S need not be limited particularly, and the lower limit is 0%. However, reducing S to less than 0.0001% increases production costs greatly, and 0.0001% is a practical lower limit of S.

N: 0.01% or less

N (nitrogen) is an impurity element and spoils the hole-expansion property by forming a coarse nitride. When N is more than 0.01%, nitrides are formed excessively, making a deterioration in the hole-expansion property significant; therefore, N is limited to 0.01% or less. More preferably, N is 0.0030% or less. The lower N is, the better it is; a lower limit of N need not be limited particularly, and the lower limit is 0%. However, reducing N to less than 0.0001% increases production costs greatly, and 0.0001% is a practical lower limit of N.

O: 0.01% or less

O (oxygen) is an impurity element and spoils the hole-expansion property by forming a coarse oxide. When O is more than 0.01%, oxides are formed excessively, making a deterioration in the hole-expansion property significant; therefore, O is limited to 0.01% or less. More preferably, O is 0.0050% or less. The lower O is, the better it is; a lower limit of O need not be limited particularly, and the lower limit is 0%. However, reducing N to less than 0.0001% increases production costs greatly, and 0.0001% is a practical lower limit of O.

Ti: 0 to 2.00%

Ti (titanium) is an element that enhances the hole-expansion property by refining grains and therefore may be contained as appropriate. When Ti is more than 2.00%, nitrides and carbides in which Ti predominates are formed excessively, which degrades the hole-expansion property; therefore an upper limit of Ti is set at 2.00%. The upper limit is preferably 0.50% or less, more preferably 0.10% or less, still more preferably 0.05% or less. Ti does not necessarily have to be contained, and a lower limit of Ti is 0%. To enhance the hole-expansion property, 0.04% or more of Ti may be contained.

Nb: 0 to 2.00%

Nb (niobium) is an element that enhances the hole-expansion property by refining grains and therefore may be contained as appropriate. When Nb is more than 2.00%, nitrides and carbides in which Nb predominates are formed excessively, which degrades the hole-expansion property; therefore an upper limit of Nb is set at 2.00%. The upper limit is preferably 0.20% or less, more preferably 0.05% or less, still more preferably 0.03% or less. Nb does not necessarily have to be contained, and a lower limit of Nb is 0%. To enhance the hole-expansion property, 0.005% of Nb may be contained.

V: 0 to 0.30%;

V (vanadium) is an element that enhances the hole-expansion property by refining grains and therefore may be contained as appropriate. When V is more than 2.00%, nitrides and carbides in which V predominates are formed excessively, which degrades the hole-expansion property; therefore an upper limit of V is set at 2.00%. The upper limit is preferably 0.50% or less, more preferably 0.10% or less, still more preferably 0.05% or less. V does not necessarily have to be contained, and a lower limit of V is 0%. To enhance the hole-expansion property, 0.04% or more of V may be contained.

Cu: 0 to 2.00%

Cu (copper) has an effect of increasing the area fraction of the metallic phase 1 and may be contained as appropriate. When Cu is more than 2.00%, it is difficult to obtain the predetermined amount of the metallic phase 3. Accordingly, an upper limit of Cu is set at 2.00%. The upper limit is preferably 1.00% or less, more preferably 0.50% or less, still more preferably 0.20% or less, and still more preferably 0.05% or less. Cu does not necessarily have to be contained, and a lower limit of Cu is 0%. Cu may be contained at 0.01% or more as necessary.

Ni: 0 to 2.00%

Ni (nickel) has an effect of increasing the area fraction of the metallic phase 1 and may be contained as appropriate. When Ni is more than 2.00%, it is difficult to obtain the predetermined amount of the metallic phase 3. Accordingly, an upper limit of Ni is set at 2.00%. The upper limit is preferably 1.00% or less, more preferably 0.50% or less, still more preferably 0.20% or less, and still more preferably 0.05% or less. Ni does not necessarily have to be contained, and a lower limit of Ni is 0%. Ni may be contained at 0.01% or more as necessary.

Mo: 0 to 1.00%

Mo (molybdenum) has an effect of increasing the area fraction of the metallic phase 3 and may be contained as appropriate. When Mo is more than 1.00%, it is difficult to secure the metallic phase 1 at 1% or more in terms of area fraction. Accordingly, an upper limit of Mo is set at 1.00%. The upper limit is preferably 0.5% or less, more preferably 0.3% or less, still more preferably 0.1% or less, and still more preferably 0.05% or less. Mo does not necessarily have to be contained, and a lower limit of Mo is 0%. Mo may be contained at 0.01% or more as necessary.

Cr: 0 to 2.00%;

Cr (chromium) has an effect of increasing the area fraction of the metallic phase 3 and may be contained as appropriate. When Cr is more than 2.00%, it is difficult to secure the metallic phase 1 at 1% or more in terms of area fraction. Accordingly, an upper limit of Cr is set at 2.00%. The upper limit is preferably 1.00% or less, more preferably 0.5% or less, still more preferably 0.25% or less, still more preferably 0.10% or less, and still more preferably 0.05% or less. Cr does not necessarily have to be contained, and a lower limit of Cr is 0%. Cr may be contained at 0.01% or more as necessary.

B: 0 to 0.01%;

B (boron) has an effect of increasing the area fraction of the metallic phase 1 and may be contained as appropriate. When B is more than 0.01%, nitrides and carbides in which B predominates are formed excessively, which degrades the hole-expansion property; therefore an upper limit of B is set at 0.01%. The upper limit is preferably 0.0025% or less, more preferably 0.0015% or less, still more preferably 0.0010% or less, and still more preferably 0.0004% or less. B does not necessarily have to be contained, and a lower limit of B is 0%. B may be contained at 0.0003% or more as necessary.

Ca: 0 to 0.010%

Ca (calcium) is an element that contributes to enhancement of the hole-expansion property by inhibiting generation of coarse oxides and coarse sulfides and therefore may be added within a range in which Ca does not spoil other properties of the steel sheet according to the present invention. When Ca is more than 0.010%, oxides in which Ca predominates are formed excessively, which degrades the hole-expansion property; therefore an upper limit of Ca is set at 0.010%. The upper limit is preferably 0.005% or less, more preferably 0.002% or less, and still more preferably 0.0005% or less. Ca does not necessarily have to be contained, and a lower limit of Ca is 0%. Ca may be contained at 0.0003% or more as necessary.

Mg: 0 to 0.010%

Mg (magnesium) is an element that contributes to enhancement of the hole-expansion property by inhibiting generation of coarse oxides and coarse sulfides and therefore may be added within a range in which Mg does not spoil other properties of the steel sheet according to the present invention. When Mg is more than 0.010%, oxides in which Mg predominates are formed excessively, which degrades the hole-expansion property; therefore an upper limit of Mg is set at 0.010%. The upper limit is preferably 0.005% or less, more preferably 0.002% or less, still more preferably 0.001% or less, and still more preferably 0.0004% or less. Mg does not necessarily have to be contained, and a lower limit of Mg is 0%. Mg may be contained at 0.0003% or more as necessary.

Zr: 0 to 0.050%

Zr (zirconium) is an element that contributes to enhancement of the hole-expansion property by inhibiting generation of coarse oxides and coarse sulfides and therefore may be added within a range in which Zr does not spoil other properties of the steel sheet according to the present invention. When Zr is more than 0.050%, oxides in which Zr predominates are formed excessively, which degrades the hole-expansion property; therefore an upper limit of Zr is set at 0.050%. More preferably, Zr is 0.005% or less. Zr does not necessarily have to be contained, and a lower limit of Zr is 0%. Zr may be contained at 0.0005% or more as necessary.

REM: 0 to 0.1%

REM (rare earth metal) is elements that contribute to enhancement of the hole-expansion property by inhibiting generation of coarse oxides and coarse sulfides and therefore may be added within a range in which REM does not spoil other properties of the steel sheet according to the present invention. When REM is more than 0.1%, oxides in which REM predominates are formed excessively, which degrades the hole-expansion property; therefore an upper limit of REM is set at 0.1%. More preferably, REM is 0.005% or less. REM does not necessarily have to be contained, and a lower limit of REM is 0%. REM may be contained at 0.0005% or more as necessary.

Here, REM is a generic name of Sc (scandium), Y (yttrium), and lanthanoids, 17 elements in total, and a content of REM refers to a total content of the above elements. REM is often added in a form of misch metal but is in some cases added in a form of La and Ce, as well as lanthanoid elements, in combination. Even in these cases, the steel sheet according to the present invention exerts effects of the steel sheet according to the present invention. Even when metallic REM such as metallic La and Ce is added, the steel sheet according to the present invention exerts the effects of the steel sheet according to the present invention.

Sb: 0 to 0.10%

Sb (antimony) is an element that contributes to enhancement of the hole-expansion property by inhibiting generation of coarse oxides and coarse sulfides and therefore may be added within a range in which Sb does not spoil other properties of the steel sheet according to the present invention. When Sb is more than 0.10%, oxides in which Sb predominates are formed excessively, which degrades the hole-expansion property; therefore an upper limit of Sb is set at 0.10%. More preferably, Sb is 0.005% or less. Sb does not necessarily have to be contained, and a lower limit of Sb is 0%. Sb may be contained at 0.0002% or more as necessary.

Sn: 0 to 0.10%

Sn (tin) is an element that contributes to enhancement of the hole-expansion property by inhibiting generation of coarse oxides and coarse sulfides and therefore may be added within a range in which Sn does not spoil other properties of the steel sheet according to the present invention. When Sn is more than 0.10%, oxides in which Sn predominates are formed excessively, which degrades the hole-expansion property; therefore an upper limit of Sn is set at 0.10%. More preferably, Sn is 0.005% or less. Sn does not necessarily have to be contained, and a lower limit of Sn is 0%. Sn may be contained at 0.0005% or more as necessary.

As: 0 to 0.5%

As (arsenic) is an element that contributes to enhancement of the hole-expansion property by inhibiting generation of coarse oxides and coarse sulfides and therefore may be added within a range in which As does not spoil other properties of the steel sheet according to the present invention. When As is more than 0.5%, oxides in which As predominates are formed excessively, which degrades the hole-expansion property; therefore an upper limit of As is set at 0.5%. More preferably, As is 0.005% or less. As does not necessarily have to be contained, and a lower limit of As is 0%. As may be contained at 0.0005% or more as necessary.

The steel sheet according to the present invention contains the elements described above, with the balance having the chemical composition consisting of Fe and impurities. Note that the impurities mean components that are mixed in producing the steel product industrially, from materials such as ores and scraps or owing to other factors.

2. Microstructure

For the steel sheet according to the present invention, a K value and a Y value are used as indices to distinguish grains making up a microstructure in terms of dislocation density of a grain.

First, the K value is defined as a value obtained by multiplying a grain average image quality (GAIQ) value by $10^{-3}$, which is obtained by performing analysis using the GAIQ method described below on a measurement value resulting from measurement by the EBSD method. The Y value is defined as a grain average misorientation (GAM) value, which is obtained by performing analysis using the GAM method, to be described later, on the measurement value resulting from the measurement by the EBSD method. The K value is an index that indicates how high a crystallinity is and an index useful for evaluating a dislocation density of a grain. The Y value is an index that is useful for evaluating a crystal misorientation of a grain. Both of the K value and the Y value are therefore used to identify microstructures in the steel sheet according to the present invention.

Next, a calculation method in the GAIQ method will be described. On a rolling-direction perpendicular cross section that lies at a ¼ depth position of a sheet thickness t (¼t area) from a steel sheet surface, the EBSD analysis is performed on a zone that is 200 μm long in a rolling direction and 100 μm long in a rolling-surface normal direction at a measurement interval of 0.2 μm, so as to obtain crystal orientation information. The EBSD analysis is here performed using an apparatus including a thermal field emission scanning electron microscope (JSM-7001F from JEOL) and an EBSD detector (DVC5-type detector from TSL solutions) and involves measurement with an exposure time of 60 msec, using "TSL OIM Data Collection 6" that comes with an EBSD analyzer. Next, in the obtained crystal orientation information, a zone having a crystal misorientation of 5° or more is defined as a grain, and an average value of Image Quality values in a grain is calculated by the GAIQ method. Here, the Image Quality value is one of analytical parameters that are built in "OIM Analysis® Version 7.0.1," a piece of software coming with an EBSD analyzer, and refers to how high a crystallinity of a measured zone is. That is, a zone having a high dislocation density shows a decreased Image Quality value because a disorder occurs in its crystallinity.

Next, a calculation method of an average misorientation (°) of a grain will be described. In the obtained crystal orientation information, a zone having a crystal misorientation of 5° or more is defined as a grain, and an average crystal misorientation of a grain is calculated by the GAM method. The average crystal misorientation of a grain refers to a "Grain Average Misorientation (GAM)" value, which is one of analytical parameters built in "OIM Analysis® Version 7.0.1," a piece software coming with an EBSD analyzer, and is obtained by calculating misorientations between neighboring measurement points and calculating an average value of the misorientations for every measurement point in the grain.

Based on the K value and the Y value obtained in the manner described above, metallic phases can be classified as follows.

Metallic phase 1: a metallic phase having a K value of less than 4.000

Metallic phase 2: a metallic phase having a K value of 4.000 or more and a Y value of 0.5 to 1.0

Metallic phase 3: a metallic phase having a K value of 4.000 or more and a Y value of less than 0.5

Metallic phase 4: a metallic phase falling under none of metallic phases 1 to 3

Metallic phase 1: 1.0% or more and less than 35.0%

The metallic phase 1 is a steel micro-structure necessary for ensuring a strength of the steel sheet. When the metallic phase 1 is less than 1.0% in terms of area fraction, it is difficult to ensure a minimum tensile strength, and therefore a lower limit of the metallic phase 1 is set at 1.0%. The lower limit is preferably 2.0% or more, more preferably 3.0% or more, still more preferably 5.0% or more. In contrast, when the metallic phase 1 is 35.0% or more in terms of area fraction, a proportion of a boundary of a metallic phase 1 with a metallic phase 2 tends to account for less than 60.0% of boundaries of the metallic phase 1 with other metallic phases, which may degrade the hole-expansion property; therefore, the metallic phase 1 is set at less than 35.0%. The metallic phase 1 is preferably less than 32.0%, more preferably less than 30.0%, and still more preferably less than 25.0%.

When the metallic phase 1 is 30.0% or more in terms of area fraction, it is difficult to set the tensile strength at less than 780 MPa, and therefore, in a case where the intention is to obtain a "steel sheet having a tensile strength of 590 MPa or more and less than 780 MPa," the metallic phase 1 is set at less than 30.0%. In a case where the intention is to obtain a "steel sheet having a tensile strength of 780 MPa or more," the metallic phase 1 may not be changed from 1.0% or more and less than 35.0%.

Metallic phase 2: 30.0% or more and 80.0% or less

The metallic phase 2 is a steel micro-structure important for obtaining an excellent hole-expansion property that is necessary in press molding. When the metallic phase 2 is less than 30.0% in terms of area fraction, it is difficult to ensure a predetermined hole-expansion property; therefore, a lower limit of the metallic phase 2 is set at 30.0%. The lower limit is preferably 40.0% or more, more preferably 50.0% or more, and still more preferably 60.0% or more. In contrast, when the metallic phase 2 is more than 80.0% in terms of area fraction, untransformed austenite is reduced excessively, failing to obtain 1.0% or more of the metallic phase 1, which makes it difficult to ensure a minimum tensile strength; therefore, an upper limit of the metallic phase 2 is set at 80.0%. The upper limit is preferably 78.0% or less, more preferably 76.0% or less, and still more preferably 75.0% or less.

In the "steel sheet having a tensile strength of 590 MPa or more and less than 780 MPa," in a case where the metallic phase 2 is less than 35.0% in terms of area fraction, there is a risk that a problem arises in that the hole-expansion property deteriorates, and when the metallic phase 2 is more than 70.0%, there is a risk that a problem arises in that the elongation deteriorates. Consequently, in the case where the intention is to obtain the "steel sheet having a tensile strength of 590 MPa or more and less than 780 MPa," it is preferable to set the metallic phase 2 at 35.0% or more and 70.0% or less. In the case where the intention is to obtain the "steel sheet having a tensile strength of 780 MPa or more", the metallic phase 2 may be 30.0% or more and 80.0% or less.

Metallic phase 3: 5.0% or more and 50.0% or less

The metallic phase 3 is a steel micro-structure necessary for ensuring an excellent ductility that is necessary in press molding. When the metallic phase 3 is less than 5.0% in terms of area fraction, it is difficult to obtain a predetermined ductility; therefore, a lower limit of the metallic phase 3 is set at 5.0%. A lower limit of the metallic phase 3 is preferably 10.0% or more, more preferably 15.0% or more or 20.0% or more. In contrast, when the metallic phase 3 is 50.0% or more in terms of area fraction, untransformed austenite is reduced excessively, failing to obtain 1.0% or more of the metallic phase 1, which makes it difficult to ensure a minimum tensile strength; therefore, an upper limit of the metallic phase 3 is set at 50.0%. The upper limit is preferably 45.0% or less, more preferably 40.0% or less, and still more preferably 30.0% or less.

When the metallic phase 3 is 35.0% or more in terms of area fraction, it is difficult to obtain a tensile strength of 780 MPa or more, and therefore, in the case where the intention is to obtain the "steel sheet having a tensile strength of 780 MPa or more," it is preferable to set the metallic phase 3 at 5.0% or more and less than 35.0%. Conversely, in the case where the intention is to obtain the "steel sheet having a tensile strength of 590 MPa or more and less than 780 MPa," it is preferable to set the metallic phase 3 at 35.0% or more and 50.0% or less.

Metallic phase 4: 5.0% or less

The metallic phase 4, which falls under none of the metallic phases 1 to 3, is a hard structure and serves as a starting point of a crack in hole expansion, degrading the hole-expansion property. The metallic phase 4 is therefore limited to 5.0% or less in total in terms of area fraction. The limitation is preferably 4.0% or less, more preferably 3.0% or less, still more preferably 2.0% or less, still more preferably 1.2% or less, and most preferably 0%. Structure observation of a metallic phase 4 under an optical microscope showed that the metallic phase 4 included upper bainite, lower bainite, pearlite, cementite, and retained austenite. Conversely, the EBSD analysis according to the present invention was performed on upper bainite, lower bainite, pearlite, cementite, and retained austenite, with the result that all of them fell under the metallic phase 4.

As seen from the above, the steel micro-structure of the steel sheet according to the present invention includes the metallic phases 1 to 4 (the metallic phase 4 may be 0%). In particular, to enhance the hole-expansion property while maintaining the tensile strength, it is preferable that the steel micro-structure is made such that a boundary of a metallic phase 1 with a metallic phase 2 accounts for 60.0% or more of boundaries of the metallic phase 1 with other metallic phases. A proportion of the boundary of the metallic phase 1 with the metallic phase 2 to the boundaries of the metallic phase 1 with the other metallic phases is preferably 70.0% or more, more preferably 80.0% or more, and still more preferably 90.0% or more. Although the reason why the hole-expansion property can be enhanced while maintaining the tensile strength by limiting the proportion within such a range is under investigation, but it is considered that the enhancement is brought by the following mechanism.

FIG. 1 is a diagram schematically illustrating an example of a microstructure of the steel sheet according to the present invention. In the steel micro-structure illustrated in FIG. 1, reference numeral 1 denotes a metallic phase 1, reference numeral 2 denotes a metallic phase 2, and reference numeral 3 denotes a metallic phase 3. In the example illustrated in FIG. 1, there is no metallic phase 4.

In the example illustrated in FIG. 1, the metallic phase 1 is a hardest phase, the metallic phase 3 is a soft phase, and the metallic phase 2 is a phase having an intermediate hardness between hardnesses of the metallic phase 1 and the metallic phase 3. Thus, when the boundary of the metallic phase 1 with the metallic phase 2 accounts for 60.0% or more of boundaries of the metallic phase 1 with other metallic phases in a microstructure, a difference in hardness across a boundary between neighboring crystal structures is small, and a stress concentration is mitigated even when the steel sheet receives severe machining such as hole expansion machining; therefore, which inhibits a rupture in a boundary between neighboring grain structures, resulting in a significant enhancement in hole-expansion property.

To form the microstructure illustrated in FIG. 1, it is necessary to form a microstructure that includes the metallic phase 1: 1.0% or more and less than 35.0%, the metallic phase 2: 30.0% or more and 80.0% or less, the metallic phase 3: 5.0% or more and 50.0% or less, and the metallic phase 4: 5.0% or less.

The steel sheet according to the present invention is a steel sheet on a surface of which a galvanized layer or a galvannealed layer is formed by a conventional method. As the galvanized layer or the galvannealed layer, for example, the following layers are preferable.

(a) A galvanized layer made of Fe at less than 7% by mass, with the balance consisting of Zn, Al, and impurities, or a galvannealed layer obtained by alloying the galvanized layer.

(b) A galvanized layer made of Fe at 7 to 15% by mass, with the balance consisting of Zn, Al, and impurities, or a galvannealed layer obtained by alloying the galvanized layer.

A main subject of the present invention is a steel sheet having a tensile strength of 590 MPa or more and 980 MPa or less. An upper limit of the tensile strength may be set at 960 MPa or 930 MPa, as necessary. A sheet thickness of the steel sheet is mostly 0.8 to 3.6 mm. A lower limit of the sheet thickness may be set at 1.0 mm, 1.8 mm, 2.0 mm, or 2.2 mm, and an upper limit of the sheet thickness may be set at 3.4 mm, 3.2 mm, or 2.0 mm.

3. Producing Method

A producing method for the steel sheet according to the present invention will be described below. The present inventors have confirmed that the microstructure according to the present invention can be obtained by making the steel sheet have the chemical composition described above and producing the steel sheet by a method satisfying at least the following conditions.

A slab to be subjected to hot rolling may be any slab produced by a conventional method and is not limited to a slab that has a specific chemical composition and specific properties. For example, any slab produced by a typical method, such as a continuously cast slab and a thin slab caster, may be acceptable.

(1) Machining Before Rough Rolling Process

Before a rough rolling process, the slab is machined such that a width of the slab in its width direction is reduced by a decrement ΔW of 30 to 60%. Through this process, lattice defects can be introduced evenly into the slab. These even lattice defects facilitate recrystallization of austenite grains in rolling in one pass before finished rolling. When the decrement ΔW is less than 30%, it is difficult to introduce the lattice defects evenly into the slab, which makes it difficult to obtain 30.0% or more of the metallic phase 2 in terms of area fraction. The decrement ΔW may be set as appropriate within a range that allows a reduction in the width of the slab in the width direction, and an upper limit of the decrement is not limited to a specific one; however, a practical upper limit of the decrement is about 60% for reasons of producibility.

(2) Hot Rolling Process (2a) The rolling in one pass before the finished rolling is performed under conditions including temperature: 880 to 950° C. and rolling reduction: 15 to 25%.

Through this process, a drive force brought by the even lattice defects that have been introduced in the above process (1) forms austenite grains having fewer lattice defects. In a case where the temperature is less than 880° C. or the rolling reduction is more than 25%, the lattice defects are introduced excessively into the austenite, which makes it difficult to obtain 30.0% or more of the metallic phase 2 in terms of area fraction. In a case where the temperature is more than 950° C. or the rolling reduction is less than 15%, the austenite grains coarsen, hindering the recrystallization of the austenite grains. As a result, the austenite grains having fewer lattice defects cannot be obtained, which makes it difficult to obtain 30.0% or more of the metal phase 2 in terms of area fraction.

(2b) The finished rolling is performed under conditions including temperature: 870 to 940° C. and rolling reduction: 6 to 10%.

Through this process, a moderate amount of lattice defects is introduced into the austenite grains. This small amount of lattice defects act as nuclei in phase transformation into the metallic phase 2 in a next cooling process. In a case where the temperature is less than 870° C. or the rolling reduction is more than 10%, the lattice defects are introduced excessively into the austenite, which makes it difficult to obtain 30.0% or more of the metallic phase 2 in terms of area fraction. In a case where the temperature is more than 940° C. or the rolling reduction is less than 6%, the lattice defects introduced into the austenite grains are decreased excessively, which makes it difficult to obtain 30.0% or more of the metallic phase 2 in terms of area fraction.

(3) Cooling Process (3a) A time between an end of the finish rolling to a start of water cooling is set at 0.5 seconds or less.

After the finished rolling, the water cooling is started within 0.5 seconds. By starting the water cooling immediately after the end of the rolling, it is possible to inhibit the austenite grains from coarsening, enabling the predetermined amount of the metallic phase 3 to be obtained in the subsequent cooling process. When the time until the start of the water cooling is more than 0.5 seconds, the coarsening of the austenite grains occurs, and nucleation sites are decreased, which makes it difficult to obtain the predetermined amount of the metallic phase 3. The time from the end of the finish rolling to the start of the water cooling may be set as appropriate as long as the time allows the cooling, and therefore a lower limit of the time is not limited to specific one; it is however difficult to set the time at 0.01 second or less in an actual operation, and therefore a practical lower limit of the time is about 0.01 second.

(3b) An average cooling rate for a temperature range of 870 to 720° C. is set at 50 to 140° C./sec.

When the average cooling rate for a temperature range of 870 to 720° C. is less than 50° C./sec, the coarsening of the austenite grains occurs, and nucleation sites of the metallic phase 3 are decreased, which makes it difficult to obtain the predetermined amount of the metallic phase 3. In contrast, when the average cooling rate is more than 140° C./sec, diffusion of carbon is inhibited excessively, and the austenite is stabilized, which makes it difficult to obtain the predetermined amount of the metallic phase 3 in a subsequent process.

(3c) A cooling time for a temperature range of 720° C. or less and more than 630° C. is set at 2 to 10 seconds. That is, an average cooling rate for this temperature region is set at 45 to 9° C./sec.

Through this process, it is possible to produce the predetermined amount of the metallic phase 3. Here, in a case where the cooling time is less than 2 seconds, transformation into the metallic phase 3 does not progress sufficiently, failing to obtain the predetermined amount of the metallic phase 3. In contrast, in a case where the cooling time is more than 10 seconds, the transformation from the austenite into the metallic phase 3 progresses excessively, which makes it difficult to obtain the predetermined amount of the metallic phase 1 in the subsequent process.

Here, in a case where the cooling time for the temperature range of 720° C. or less and more than 630° C. is 5 seconds or more, it is not possible to set the metallic phase 3 at less than 35.0% in terms of area fraction. Accordingly, in a case where the intention is to obtain the steel sheet having a tensile strength of 780 MPa or more, this cooling time is set at less than 5 seconds, and in a case where the intention is to obtain the steel sheet having a tensile strength of 590 MPa or more and less than 780 MPa, this cooling time is set at 5 seconds or more.

(3d) A cooling time for a temperature range of 630° C. or less and more than 600° C. is set at 2 seconds or more and less than 6 seconds. That is, an average cooling rate for this temperature range is set at 15 to 5° C./sec.

Through this process, it is possible to produce the metallic phase 2. In a case where the cooling time is less than 2 seconds, carbon contained in untransformed austenite cannot diffuse sufficiently, which causes the metallic phase 4 to be produced in a large amount. In contrast, in a case where the cooling time is 6 seconds or more, the metallic phase 4 is produced in a large amount from the austenite, leading to a deterioration in the hole-expansion property.

(3e) Cooling (e.g., water cooling) is performed such that an average cooling rate for a temperature range of 600° C. or less and more than 450° C. is 50 to 100° C./sec.

Through this process, it is possible to set the metallic phase 4 at 5.0% or less. When the average cooling rate is less than 50° C./sec, the area fraction of the metallic phase 4 increases excessively, degrading the hole-expansion property. In contrast, when the average cooling rate is more than 100° C./sec, diffusion of carbon is inhibited excessively, and the austenite is stabilized, which makes it difficult to obtain the predetermined amount of the metallic phase 1 in a subsequent process.

(d) Coiling Process

The steel sheet is coiled at a temperature of 25° C. or more and 400° C. or less. Through this process, it is possible to bring about transformation from the austenite into the metallic phase 1. When the coiling temperature is more than 400° C., setting the metallic phase 4 at 5.0% or less fails, degrading the hole-expansion property. The coiling is difficult to perform at a room temperature or lower in an actual operation, and therefore, a lower limit of the coiling temperature is set at 25° C.

(5) Additional Processes

The steel sheet that has been coiled in the above process (4) may be uncoiled, pickled, and then subjected to cold rolling. By subjecting the steel sheet to the cold rolling after performing the pickling to remove oxides on a surface of the steel sheet, it is possible to plan enhancement in the tensile strength, enhancement in chemical treatment properties, enhancement in platability, and the like. The pickling may be performed once or a plurality of times.

A rolling reduction in the cold rolling is preferably 30 to 80%. When the rolling reduction is less than 30%, the tensile strength is not enhanced; therefore the rolling reduction is set at 30% or more. The rolling reduction is preferably 40% or more. In contrast, when the rolling reduction is more than 80%, the tensile strength increases excessively, degrading the ductility and the hole-expansion property; therefore the rolling reduction is set at 80% or less. The rolling reduction is preferably 70% or less.

The microstructure of the steel sheet according to the present invention that is defined with the K value and the Y value is a structure obtained through the above processes (1) to (4); therefore, the K value and the Y value do not change greatly even when the cold rolling is performed on the steel sheet, and the microstructure remains substantially unchanged after the cold rolling. Accordingly, even when the tensile strength increases by performing the cold rolling on the steel sheet, the hole-expansion property does not deteriorate.

The steel sheet subjected to the cold rolling may be put into a continuous annealing line to be annealed at 750 to 900° C. The present inventors empirically confirmed that the K value and the Y value do not change greatly by the annealing at 750 to 900° C. Therefore, performing the annealing on the steel sheet subjected to the cold rolling does not degrade the hole-expansion property. An annealing temperature is preferably 800 to 850° C. from the viewpoint of inhibiting the K value and the Y value from changing as much as possible.

An annealing time is not limited to a specific one. The annealing time may be set as appropriate such that the K value and the Y value are inhibited from changing as much as possible.

In the producing method for the plated steel sheet according to the present invention, the steel sheet produced by the producing method for a steel sheet according to the present invention is galvanized by a conventional method. In the producing method for the galvannealed steel sheet according to the present invention, the steel sheet produced by the producing method for a steel sheet according to the present invention is galvannealed by a conventional method.

The K value and the Y value of the microstructure do not change at a plating temperature and an alloying temperature in the conventional method, and therefore the hole-expansion property of the steel sheet does not deteriorate at the temperatures.

EXAMPLE

Next, examples of the present invention will be described, but conditions described in the examples are merely an example of conditions that was taken for confirming feasibility and effects of the present invention, and the present invention is not limited to this example of conditions. The present invention can include various conditions as long as the conditions achieve the objective of the present invention without departing from the gist of the present invention.

Example 1

From slabs having compositions shown in Table 1 and Table 2, steel sheets were produced under conditions shown in Table 3 and Table 4.

TABLE 1

| Steel No. | Chemical composition (mass %, balance: Fe and impurities) | | | | | | | | | | |
|---|---|---|---|---|---|---|---|---|---|---|---|
| | C | Si | Mn | Al | P | S | N | O | Ti | Nb | V |
| A1 | 0.048 | 0.024 | 1.46 | 0.34 | 0.010 | 0.002 | 0.002 | 0.001 | 0.05 | 0.01 | — |
| A2 | 0.048 | 0.024 | 1.48 | 0.34 | 0.009 | 0.003 | 0.003 | 0.001 | 0.13 | 0.02 | — |
| A3 | 0.017 | 0.030 | 1.60 | 0.74 | 0.008 | 0.003 | 0.003 | 0.003 | — | — | — |
| A4 | 0.067 | 0.042 | 1.34 | 0.55 | 0.020 | 0.003 | 0.001 | 0.003 | — | — | — |
| A5 | 0.121 | 0.049 | 1.51 | 0.42 | 0.015 | 0.003 | 0.001 | 0.002 | — | — | — |
| A6 | 0.282* | 0.043 | 1.65 | 0.90 | 0.020 | 0.002 | 0.002 | 0.003 | — | — | — |
| A7 | 0.053 | 0.010 | 1.58 | 0.83 | 0.008 | 0.003 | 0.001 | 0.004 | — | — | — |
| A8 | 0.044 | 0.046 | 1.87 | 0.79 | 0.009 | 0.002 | 0.001 | 0.002 | — | — | 0.01 |
| A9 | 0.058 | 0.100 | 1.84 | 0.40 | 0.014 | 0.004 | 0.001 | 0.003 | — | — | — |
| A10 | 0.061 | 0.122* | 1.62 | 0.62 | 0.008 | 0.004 | 0.002 | 0.002 | — | — | — |
| A11 | 0.064 | 0.022 | 0.27* | 0.38 | 0.010 | 0.002 | 0.002 | 0.003 | — | — | — |
| A12 | 0.039 | 0.051 | 0.80 | 1.02 | 0.013 | 0.005 | 0.001 | 0.002 | — | — | — |
| A13 | 0.066 | 0.047 | 1.28 | 0.88 | 0.006 | 0.004 | 0.003 | 0.001 | — | — | — |
| A14 | 0.042 | 0.034 | 2.84 | 0.40 | 0.014 | 0.002 | 0.002 | 0.004 | — | — | — |
| A15 | 0.061 | 0.050 | 4.22* | 0.99 | 0.018 | 0.002 | 0.001 | 0.002 | — | — | — |
| A16 | 0.078 | 0.035 | 1.76 | 0.19 | 0.009 | 0.003 | 0.002 | 0.002 | — | — | — |

TABLE 1-continued

| Steel No. | Chemical composition (mass %, balance: Fe and impurities) | | | | | | | | | | |
|---|---|---|---|---|---|---|---|---|---|---|---|
| | C | Si | Mn | Al | P | S | N | O | Ti | Nb | V |
| A17 | 0.078 | 0.035 | 1.98 | 0.67 | 0.009 | 0.004 | 0.001 | 0.000 | — | — | — |
| A18 | 0.063 | 0.046 | 1.71 | 2.12 | 0.008 | 0.002 | 0.003 | 0.001 | — | — | — |
| A19 | 0.058 | 0.026 | 1.53 | 3.18* | 0.005 | 0.004 | 0.002 | 0.003 | — | — | — |
| A20 | 0.043 | 0.016 | 1.80 | 0.43 | 0.008 | 0.002 | 0.001 | 0.004 | 0.05 | — | — |
| A21 | 0.057 | 0.021 | 1.88 | 0.67 | 0.005 | 0.004 | 0.003 | 0.002 | — | 0.06 | — |
| A22 | 0.071 | 0.023 | 1.77 | 0.36 | 0.014 | 0.004 | 0.001 | 0.003 | — | — | 0.06 |
| A23 | 0.046 | 0.027 | 1.94 | 0.77 | 0.019 | 0.003 | 0.003 | 0.002 | — | — | — |
| A24 | 0.069 | 0.014 | 1.64 | 0.99 | 0.007 | 0.003 | 0.003 | 0.005 | — | — | — |
| A25 | 0.075 | 0.042 | 1.30 | 0.37 | 0.011 | 0.002 | 0.002 | 0.004 | — | — | — |
| A26 | 0.060 | 0.052 | 1.19 | 0.36 | 0.012 | 0.005 | 0.003 | 0.001 | — | — | — |
| A27 | 0.042 | 0.032 | 1.55 | 0.47 | 0.014 | 0.002 | 0.002 | 0.002 | — | — | — |
| A28 | 0.055 | 0.026 | 1.68 | 0.78 | 0.006 | 0.003 | 0.002 | 0.005 | — | — | — |
| A29 | 0.056 | 0.029 | 1.50 | 0.91 | 0.009 | 0.002 | 0.002 | 0.002 | — | — | — |
| A30 | 0.044 | 0.024 | 1.46 | 0.34 | 0.010 | 0.002 | 0.002 | 0.001 | — | — | — |
| A31 | 0.046 | 0.024 | 1.43 | 0.34 | 0.010 | 0.002 | 0.002 | 0.001 | — | — | — |
| A32 | 0.048 | 0.027 | 1.46 | 0.34 | 0.010 | 0.002 | 0.002 | 0.001 | — | — | — |

The mark "*" indicates that the value fell out of the range defined in the present invention.

TABLE 2

| Steel No. | Chemical composition (mass %, balance: Fe and impurities) | | | | | | | | | | | |
|---|---|---|---|---|---|---|---|---|---|---|---|---|
| | Cu | Ni | Mo | Cr | B | Ca | Mg | Zr | REM | Sb | Sn | As |
| A1 | — | — | — | — | 0.0001 | — | — | — | — | 0.001 | 0.001 | 0.001 |
| A2 | — | — | — | 0.11 | — | — | — | — | — | — | 0.002 | 0.002 |
| A3 | — | 0.01 | — | — | — | — | — | — | — | 0.001 | 0.001 | 0.001 |
| A4 | 0.01 | 0.02 | — | — | 0.0001 | — | — | — | — | 0.001 | 0.003 | 0.002 |
| A5 | 0.01 | 0.01 | — | — | 0.0001 | — | — | — | — | 0.001 | 0.002 | 0.001 |
| A6 | 0.02 | 0.03 | — | — | 0.0002 | — | — | — | — | 0.002 | 0.001 | 0.003 |
| A7 | 0.01 | 0.02 | — | — | 0.0001 | — | — | — | — | 0.001 | — | 0.001 |
| A8 | 0.01 | 0.01 | — | — | — | — | — | — | — | 0.001 | 0.001 | 0.001 |
| A9 | 0.02 | 0.02 | — | — | 0.0001 | — | — | — | — | 0.001 | 0.001 | 0.002 |
| A10 | 0.01 | 0.01 | — | — | 0.0001 | — | — | — | — | 0.001 | 0.002 | 0.001 |
| A11 | 0.01 | 0.01 | — | — | 0.0001 | — | — | — | — | — | 0.001 | 0.001 |
| A12 | 0.02 | 0.02 | — | — | 0.0002 | — | — | — | — | 0.002 | 0.003 | 0.001 |
| A13 | 0.01 | 0.01 | — | — | 0.0002 | — | — | — | — | 0.001 | 0.001 | — |
| A14 | 0.01 | 0.01 | — | — | 0.0001 | — | — | — | — | 0.001 | — | 0.003 |
| A15 | 0.02 | 0.01 | — | — | 0.0001 | — | — | — | — | 0.001 | 0.001 | 0.002 |
| A16 | 0.01 | 0.01 | — | — | 0.0001 | — | — | — | — | 0.001 | 0.002 | 0.002 |
| A17 | 0.03 | 0.02 | — | — | 0.0001 | — | — | — | — | 0.001 | 0.001 | 0.001 |
| A18 | 0.01 | 0.01 | — | — | 0.0001 | — | — | — | — | 0.001 | 0.003 | 0.002 |
| A19 | 0.01 | 0.01 | — | — | 0.0001 | — | — | — | — | 0.001 | 0.001 | 0.001 |
| A20 | 0.01 | 0.01 | — | — | — | — | — | — | — | 0.001 | — | — |
| A21 | 0.01 | 0.01 | — | — | — | — | — | — | — | — | — | — |
| A22 | 0.01 | 0.01 | — | — | — | — | — | — | — | 0.002 | 0.001 | 0.001 |
| A23 | 0.32 | 0.01 | — | — | — | — | — | — | — | 0.001 | 0.001 | 0.001 |
| A24 | 0.01 | 0.43 | — | — | — | — | — | — | — | 0.001 | 0.001 | 0.001 |
| A25 | 0.01 | 0.01 | 0.30 | — | — | — | — | — | — | 0.001 | 0.001 | 0.001 |
| A26 | 0.01 | 0.01 | — | 0.20 | — | — | — | — | — | 0.001 | 0.001 | 0.001 |
| A27 | 0.01 | 0.02 | — | — | 0.0008 | — | — | — | — | 0.002 | 0.001 | 0.001 |
| A28 | 0.02 | 0.01 | — | — | — | 0.002 | — | — | — | 0.001 | 0.002 | 0.001 |
| A29 | 0.01 | 0.01 | — | — | — | — | 0.002 | — | — | 0.001 | 0.001 | 0.001 |
| A30 | — | — | — | — | — | — | — | — | — | — | — | — |
| A31 | — | — | — | — | — | — | — | 0.030 | — | — | — | — |
| A32 | — | — | — | — | — | — | — | — | 0.040 | — | — | — |

TABLE 3

| No. | Steel No. | Process (1) Decrement (%) | Process (2a) Temp. (° C.) | Process (2a) Rolling Reduction (%) | Process (2b) Temp. (° C.) | Process (2b) Rolling Reduction (%) | Process (3a) Time From Finishing To Water Cooling (Sec) | Process (3b) Average Cooling Rate (° C./Sec) |
|---|---|---|---|---|---|---|---|---|
| 1 | A1 | 40 | 920 | 20 | 902 | 8 | 0.20 | 60 |
| 2 | A2 | 40 | 915 | 20 | 892 | 8 | 0.20 | 63 |

TABLE 3-continued

| No. | Steel No. | Process (1) Decrement (%) | Process (2a) Temp. (° C.) | Process (2a) Rolling Reduction (%) | Process (2b) Temp. (° C.) | Process (2b) Rolling Reduction (%) | Process (3a) Time From Finishing To Water Cooling (Sec) | Process (3b) Average Cooling Rate (° C./Sec) |
|---|---|---|---|---|---|---|---|---|
| 3 | A3 | 59 | 907 | 24 | 892 | 10 | 0.14 | 125 |
| 4 | A4 | 42 | 885 | 19 | 863 | 8 | 0.24 | 121 |
| 5 | A5 | 47 | 938 | 18 | 923 | 8 | 0.41 | 93 |
| 6 | A6 | 29 | 937 | 19 | 917 | 11 | 0.24 | 136 |
| 7 | A7 | 44 | 897 | 17 | 888 | 10 | 0.16 | 132 |
| 8 | A8 | 41 | 936 | 25 | 916 | 8 | 0.37 | 106 |
| 9 | A9 | 39 | 928 | 17 | 910 | 10 | 0.26 | 78 |
| 10 | A10 | 58 | 874 | 19 | 877 | 10 | 0.02 | 118 |
| 11 | A11 | 43 | 916 | 13 | 900 | 6 | 0.25 | 66 |
| 12 | A12 | 33 | 942 | 21 | 940 | 10 | 0.09 | 84 |
| 13 | A13 | 45 | 909 | 19 | 894 | 8 | 0.28 | 79 |
| 14 | A14 | 42 | 942 | 21 | 928 | 9 | 0.28 | 59 |
| 15 | A15 | 47 | 923 | 18 | 902 | 5 | 0.44 | 119 |
| 16 | A16 | 40 | 901 | 21 | 873 | 10 | 0.14 | 115 |
| 17 | A17 | 35 | 906 | 20 | 878 | 7 | 0.04 | 56 |
| 18 | A18 | 32 | 886 | 17 | 868 | 9 | 0.17 | 122 |
| 19 | A19 | 51 | 902 | 20 | 892 | 7 | 0.46 | 131 |
| 20 | A20 | 34 | 894 | 21 | 876 | 5 | 0.14 | 96 |
| 21 | A21 | 36 | 906 | 21 | 895 | 10 | 0.35 | 72 |
| 22 | A22 | 47 | 950 | 21 | 935 | 9 | 0.32 | 111 |
| 23 | A23 | 53 | 942 | 20 | 929 | 9 | 0.25 | 59 |
| 24 | A24 | 44 | 929 | 20 | 911 | 6 | 0.22 | 121 |
| 25 | A25 | 56 | 917 | 23 | 904 | 8 | 0.45 | 75 |
| 26 | A26 | 34 | 910 | 20 | 897 | 11 | 0.04 | 134 |
| 27 | A27 | 34 | 955 | 24 | 923 | 6 | 0.46 | 67 |
| 28 | A28 | 57 | 903 | 26 | 901 | 9 | 0.33 | 56 |
| 29 | A29 | 51 | 951 | 14 | 942 | 8 | 0.26 | 60 |
| 30 | A30 | 57 | 909 | 21 | 896 | 10 | 0.09 | 118 |
| 31 | A31 | 58 | 899 | 19 | 877 | 10 | 0.15 | 101 |
| 32 | A32 | 56 | 881 | 20 | 871 | 10 | 0.11 | 96 |
| 33 | A1 | 21# | 885 | 22 | 868 | 10 | 0.38 | 60 |
| 34 | A1 | 55 | 912 | 20 | 892 | 3# | 0.05 | 84 |
| 35 | A1 | 48 | 931 | 15 | 911 | 12# | 0.34 | 50 |
| 36 | A1 | 47 | 899 | 21 | 864 | 9 | 0.26 | 139 |
| 37 | A1 | 36 | 874 | 19 | 879 | 8 | 0.04 | 73 |
| 38 | A1 | 53 | 936 | 22 | 919 | 10 | 0.34 | 125 |
| 39 | A1 | 40 | 933 | 23 | 910 | 9 | 0.26 | 119 |
| 40 | A1 | 42 | 948 | 24 | 922 | 6 | 0.44 | 46 |
| 41 | A1 | 42 | 949 | 19 | 920 | 10 | 0.12 | 71 |
| 42 | A1 | 50 | 891 | 24 | 879 | 5 | 0.43 | 90 |
| 43 | A1 | 38 | 922 | 23 | 903 | 7 | 0.23 | 52 |
| 44 | A1 | 37 | 912 | 20 | 897 | 8 | 0.22 | 62 |
| 45 | A1 | 59 | 905 | 24 | 892 | 10 | 0.18 | 127 |

The mark "#" indicates that the value fell out of the recommended condition.

TABLE 4

| No. | Steel No. | Process (3c) Cooling Time (Sec) | Process (3d) Cooling Time (Sec) | Process (3e) Cooling Time (Sec) | Process (4) Average Cooling Rate (° C./Sec) | Plating Galvanizing | Plating Galvannealing | Sheet Thickness (mm) |
|---|---|---|---|---|---|---|---|---|
| 1 | A1 | 6.4 | 3.0 | 70 | 40 | No | No | 3.0 |
| 2 | A2 | 6.3 | 0.9# | 70 | 43 | No | No | 3.0 |
| 3 | A3 | 5.9 | 3.0 | 94 | 384 | No | No | 2.1 |
| 4 | A4 | 7.2 | 3.6 | 66 | 233 | No | No | 2.0 |
| 5 | A5 | 7.3 | 4.0 | 53 | 313 | No | No | 2.4 |
| 6 | A6 | 6.7 | 2.3 | 79 | 160 | No | No | 2.1 |
| 7 | A7 | 7.1 | 3.9 | 60 | 100 | No | No | 2.5 |
| 8 | A8 | 7.7 | 5.5 | 84 | 63 | No | No | 2.5 |
| 9 | A9 | 7.1 | 2.8 | 87 | 106 | No | No | 1.9 |
| 10 | A10 | 7.7 | 5.7 | 74 | 264 | No | No | 2.1 |
| 11 | A11 | 7.5 | 3.0 | 97 | 178 | No | No | 2.5 |
| 12 | A12 | 8.3 | 3.5 | 70 | 366 | No | No | 2.3 |
| 13 | A13 | 7.8 | 4.5 | 78 | 89 | No | No | 2.5 |
| 14 | A14 | 6.7 | 4.9 | 58 | 269 | No | No | 2.3 |

TABLE 4-continued

| Steel No. | Steel No. | Process (3c) Cooling Time (Sec) | Process (3d) Cooling Time (Sec) | Process (3e) Cooling Time (Sec) | Process (4) Average Cooling Rate (° C./Sec) | Plating Galvanizing | Plating Galvannealing | Sheet Thickness (mm) |
|---|---|---|---|---|---|---|---|---|
| 15 | A15 | 6.0 | 5.1 | 99 | 333 | No | No | 2.2 |
| 16 | A16 | 7.4 | 3.7 | 70 | 156 | No | No | 2.5 |
| 17 | A17 | 6.2 | 3.5 | 79 | 298 | No | No | 2.3 |
| 18 | A18 | 5.9 | 5.9 | 72 | 362 | No | No | 2.0 |
| 19 | A19 | 6.8 | 4.6 | 96 | 271 | No | No | 2.3 |
| 20 | A20 | 7.1 | 5.2 | 98 | 139 | No | No | 2.4 |
| 21 | A21 | 7.1 | 4.4 | 75 | 66 | No | No | 2.2 |
| 22 | A22 | 6.2 | 2.8 | 70 | 180 | No | No | 2.3 |
| 23 | A23 | 7.9 | 4.7 | 94 | 191 | No | No | 2.5 |
| 24 | A24 | 7.6 | 2.2 | 51 | 85 | No | No | 2.6 |
| 25 | A25 | 7.5 | 5.4 | 59 | 131 | No | No | 2.3 |
| 26 | A26 | 7.3 | 5.6 | 50 | 190 | No | No | 2.1 |
| 27 | A27 | 7.3 | 4.0 | 52 | 296 | No | No | 2.5 |
| 28 | A28 | 6.7 | 3.2 | 71 | 213 | No | No | 2.5 |
| 29 | A29 | 7.4 | 2.4 | 85 | 36 | No | No | 2.1 |
| 30 | A30 | 5.9 | 3.0 | 90 | 205 | No | No | 2.1 |
| 31 | A31 | 6.2 | 2.8 | 94 | 340 | No | No | 2.1 |
| 32 | A32 | 6.0 | 3.0 | 85 | 365 | No | No | 2.1 |
| 33 | A1 | 6.6 | 5.3 | 62 | 325 | No | No | 2.6 |
| 34 | A1 | 7.6 | 4.5 | 59 | 79 | No | No | 2.4 |
| 35 | A1 | 7.1 | 2.4 | 80 | 221 | No | No | 2.3 |
| 36 | A1 | 6.3 | 0.6# | 77 | 217 | No | No | 2.3 |
| 37 | A1 | 7.8 | 6.7# | 57 | 95 | No | No | 1.9 |
| 38 | A1 | 7.3 | 6.2 | 38# | 335 | No | No | 2.3 |
| 39 | A1 | 7.5 | 5.9 | 54 | 429# | No | No | 2.4 |
| 40 | A1 | 6.9 | 4.3 | 92 | 344 | Yes | No | 2.5 |
| 41 | A1 | 7.9 | 3.0 | 57 | 113 | Yes | No | 2.3 |
| 42 | A1 | 6.0 | 6.0 | 81 | 80 | Yes | Yes | 2.1 |
| 43 | A1 | 7.3 | 1.8# | 71 | 21 | No | No | 2.9 |
| 44 | A1 | 6.4 | 7.2# | 71 | 30 | No | No | 2.9 |
| 45 | A1 | 2.4# | 9.6# | 81 | 217 | No | No | 2.1 |

The mark "#" indicates that the value fell out of the recommended condition.

In Table 3 and Table 4, PROCESS (1) means the machining performed before the rough rolling process and shows, in the tables, its decrements ΔW (%) in length of the slabs in the width direction. PROCESS (2a) and PROCESS (2b) means the rolling in one pass before the finished rolling and the finished rolling, respectively, and show, in the tables, their temperatures (° C.) and their rolling reductions (%). PROCESS (3a) refers to retention performed from the end of the finish rolling until the start of the water cooling and shows, in the tables, its retention times. PROCESS (3b) refers to the cooling process for the temperature range of 870 to 720° C. and shows, in the tables, its average cooling rates (° C./sec) in the temperature range. PROCESS (3c) refers to the cooling process for the temperature range of 720° C. or less and more than 630° C. and shows, in the tables, its cooling times (sec) in the temperature range. PROCESS (3d) refers to the cooling process for the temperature range of 630° C. or less and more than 600° C. and shows, in the tables, its cooling times (sec) in the temperature range. PROCESS (3e) refers to the cooling process for the temperature range of 600° C. or less and more than 450° C. and shows, in the tables, its average cooling rates (° C./sec) in the temperature range. PROCESS (4) refers to the coiling process and shows, in the tables, its coiling temperatures (° C.).

On the obtained steel sheets, their steel micro-structures, mechanical properties, and hole-expansion properties were measured.

<Measurement of Steel Micro-Structure>

On a rolling-direction perpendicular cross section that lies at a ¼ depth position of a sheet thickness t (¼t area) from a steel sheet surface, the EBSD analysis is performed on a zone that is 200 μm long in a rolling direction and 100 μm long in a rolling-surface normal direction at a measurement interval of 0.2 μm, so as to obtain crystal orientation information. The EBSD analysis was here performed using an apparatus including a thermal field emission scanning electron microscope (JSM-7001F from JEOL) and an EBSD detector (HIKARI detector from TSL solutions) at an analyzing speed of 200 to 300 points/sec. Next, in the obtained crystal orientation information, a zone having a crystal misorientation of 5° or more is defined as a grain, an average misorientation of the grain is calculated, and proportions of grains having the misorientations of less than 0.5° or 0.5 to 1.0° are calculated.

The "average crystal misorientation of a grain" in the present invention is an average value of "Grain Average Misorientations (GAM)," each of which is an orientation spread of the grain, and is obtained by calculating misorientations between neighboring measurement points and calculating an average value of the misorientations for every measurement point in the grain. Values of the GAM were calculated with "OIM Analysis® Version 7.0.1," a piece of software coming with an EBSD analyzer.

An "average value of Image Qualities in a grain" in the present invention actually means an average value of values obtained by analyzing, by the Grain average image quality (GAIQ) method, measurement values from measurement by the EBSD method.

In the GAIQ, on an assumption that a zone having a crystal misorientation of 50 or more is defined as a grain in crystal orientation information obtained by the EBSD analysis, a proportion of grains having an in-grain average dislocation density of less than 4000 is calculated. The values of the GAIQ can be calculated with "OIM Analysis® Version 7.0.1," a piece of software coming with an EBSD analyzer.

Based on the K value and the Y value obtained in the manner described above, metallic phases were classified as follows.

Metallic phase 1: a metallic phase having a K value of less than 4.000

Metallic phase 2: a metallic phase having a K value of 4.000 or more and a Y value of 0.5 to 1.0

Metallic phase 3: a metallic phase having a K value of 4.000 or more and a Y value of less than 0.5

Metallic phase 4: a metallic phase falling under none of metallic phases 1 to 3

<Measurement of Mechanical Properties>

The tensile strength and the elongation are evaluated in such a manner that a JIS No. 5 specimen is taken in a direction perpendicular to a rolling direction of a steel sheet and a tensile test is performed in conformity with JIS Z 2242 to measure a tensile strength (TS) and a total elongation (El).

<Hole-Expansion Property>

The hole-expansion property is evaluated in such a manner that a hole expansion test is performed in conformity with JFS-T1001-1996 of The Japan Iron and Steel Federation Standard to measure a hole expansion rate (HER).

Results of the above are shown in Table 5.

TABLE 5

| | | Steel Micro-Structure (Area %) | | | | Proportion Of Boundary Between | Mechanical Properties | | |
|---|---|---|---|---|---|---|---|---|---|
| No. | Steel No. | Metallic Phase 1 | Metallic Phase 2 | Metallic Phase 3 | Metallic Phase 4 | Metallic Phase 1 And Metallic Phase 2 (%) | TS (MPa) | λ (%) | EL (%) |
| 1 | A1 | 2.3 | 52.6 | 45.1 | 0.0 | 92 | 644 | 108.8 | 27.9 |
| 2 | A2 | 3.5 | 23.0* | 48.5 | 25.0* | 43** | 600 | 91.0 | 30.3 |
| 3 | A3 | 1.5 | 49.4 | 49.1 | 0.0 | 92 | 637 | 111.1 | 31.3 |
| 4 | A4 | 2.6 | 51.8 | 45.6 | 0.0 | 97 | 618 | 118.3 | 31.7 |
| 5 | A5 | 2.2 | 55.4 | 42.4 | 0.0 | 91 | 597 | 105.7 | 27.4 |
| 6 | A6 | 0.0* | 39.6 | 36.3 | 24.1* | 0** | 620 | 52.4 | 33.4 |
| 7 | A7 | 3.3 | 58.7 | 38.0 | 0.0 | 71 | 666 | 103.2 | 28.5 |
| 8 | A8 | 2.8 | 56.0 | 41.2 | 0.0 | 86 | 652 | 107.8 | 31.9 |
| 9 | A9 | 2.1 | 50.9 | 47.0 | 0.0 | 90 | 638 | 110.2 | 32.1 |
| 10 | A10 | 0.0* | 41.5 | 58.5* | 0.0 | 0** | 575 | 108.8 | 34.5 |
| 11 | A11 | 0.0* | 45.6 | 54.4* | 0.0 | 0** | 517 | 109.9 | 34.1 |
| 12 | A12 | 2.6 | 49.0 | 48.4 | 0.0 | 77 | 605 | 108.5 | 30.4 |
| 13 | A13 | 2.8 | 52.7 | 44.5 | 0.0 | 84 | 625 | 107.4 | 30.9 |
| 14 | A14 | 3.3 | 55.3 | 41.4 | 0.0 | 88 | 637 | 107.9 | 27.7 |
| 15 | A15 | 2.8 | 42.5 | 36.6 | 18.1* | 90 | 969 | 106.6 | 30.2 |
| 16 | A16 | 3.3 | 60.1 | 36.6 | 0.0 | 93 | 618 | 107.9 | 29.1 |
| 17 | A17 | 3.2 | 56.9 | 39.9 | 0.0 | 91 | 595 | 103.2 | 31.5 |
| 18 | A18 | 2.0 | 55.6 | 42.4 | 0.0 | 89 | 608 | 103.1 | 33.6 |
| 19 | A19 | 0.4* | 44.1 | 55.5* | 0.0 | 0** | 511 | 102.4 | 35.2 |
| 20 | A20 | 2.3 | 52.7 | 45.0 | 0.0 | 91 | 648 | 109.8 | 30.8 |
| 21 | A21 | 2.2 | 52.4 | 45.4 | 0.0 | 90 | 641 | 109.9 | 30.2 |
| 22 | A22 | 2.6 | 52.0 | 45.4 | 0.0 | 92 | 653 | 111.0 | 31.2 |
| 23 | A23 | 3.5 | 57.4 | 39.1 | 0.0 | 91 | 627 | 108.3 | 30.9 |
| 24 | A24 | 3.6 | 57.4 | 39.0 | 0.0 | 92 | 623 | 109.3 | 30.6 |
| 25 | A25 | 2.0 | 49.2 | 48.8 | 0.0 | 90 | 616 | 110.1 | 30.7 |
| 26 | A26 | 2.4 | 49.1 | 48.5 | 0.0 | 89 | 620 | 110.2 | 28.2 |
| 27 | A27 | 3.7 | 58.0 | 38.3 | 0.0 | 70 | 649 | 103.9 | 29.7 |
| 28 | A28 | 2.2 | 52.7 | 45.1 | 0.0 | 94 | 639 | 116.4 | 28.0 |
| 29 | A29 | 2.4 | 52.3 | 45.3 | 0.0 | 90 | 643 | 117.2 | 27.9 |
| 30 | A30 | 2.1 | 52.1 | 45.8 | 0.0 | 92 | 637 | 111.1 | 30.8 |
| 31 | A31 | 1.8 | 49.6 | 48.6 | 0.0 | 91 | 630 | 109.2 | 31.0 |
| 32 | A32 | 2.3 | 50.1 | 47.6 | 0.0 | 90 | 642 | 112.6 | 30.7 |
| 33 | A1 | 2.2 | 8.5* | 45.2 | 44.1* | 4** | 646 | 90.5 | 28.1 |
| 34 | A1 | 2.3 | 13.2* | 45.1 | 39.4* | 6** | 647 | 92.1 | 28.0 |
| 35 | A1 | 2.6 | 18.5* | 45.0 | 33.9* | 11** | 648 | 90.9 | 28.3 |
| 36 | A1 | 2.2 | 7.7* | 45.2 | 44.9* | 10** | 641 | 89.8 | 28.2 |
| 37 | A1 | 2.4 | 10.7* | 45.2 | 41.7* | 13** | 647 | 89.2 | 29.4 |
| 38 | A1 | 2.6 | 12.4* | 45.1 | 39.9* | 21** | 639 | 89.2 | 27.7 |
| 39 | A1 | 2.4 | 44.9 | 45.3 | 7.4* | 62 | 643 | 89.5 | 28.5 |
| 40 | A1 | 2.4 | 52.4 | 45.2 | 0.0 | 94 | 650 | 108.7 | 28.1 |
| 41 | A1 | 2.4 | 51.3 | 45.2 | 1.1 | 96 | 644 | 103.3 | 27.7 |
| 42 | A1 | 2.5 | 51.2 | 45.0 | 1.3 | 91 | 651 | 101.1 | 27.9 |
| 43 | A1 | 27.8 | 22.7* | 45.0 | 4.5 | 43** | 637 | 58.6 | 28.4 |
| 44 | A1 | 0.4* | 54.6 | 45.0 | 0.0 | 99 | 554 | 101.2 | 29.9 |
| 45 | A1 | 2.2 | 95.5* | 2.3* | 0.0 | 97 | 601 | 120.3 | 12.1 |

The mark "*" indicates that the value fell out of the range defined in the present invention.
The mark "**" indicates that the value fell out of the preferable range in the present invention.

As shown in Table 5, inventive examples of the present invention have tensile strengths of 590 MPa or more and sufficient hole-expansion properties.

Example 2

From slabs having chemical compositions shown in Table 6 and Table 7, steel sheets were produced under conditions shown in Table 8 and Table 9.

TABLE 6

| Steel No. | Chemical composition (mass %, balance: Fe and impurities) | | | | | | | | | | |
|---|---|---|---|---|---|---|---|---|---|---|---|
| | C | Si | Mn | Al | P | S | N | O | Ti | Nb | V |
| B1  | 0.042  | 0.020  | 1.46  | 0.31  | 0.011 | 0.003 | 0.003 | 0.001 | 0.10 | 0.02 | — |
| B2  | 0.048  | 0.024  | 1.48  | 0.34  | 0.009 | 0.003 | 0.003 | 0.001 | 0.13 | 0.02 | — |
| B3  | 0.019  | 0.028  | 1.60  | 0.74  | 0.008 | 0.003 | 0.003 | 0.003 | — | — | — |
| B4  | 0.068  | 0.040  | 1.32  | 0.56  | 0.020 | 0.003 | 0.001 | 0.003 | — | — | — |
| B5  | 0.120  | 0.047  | 1.49  | 0.39  | 0.015 | 0.003 | 0.001 | 0.002 | — | — | — |
| B6  | 0.280* | 0.045  | 1.68  | 0.92  | 0.020 | 0.002 | 0.002 | 0.003 | — | — | — |
| B7  | 0.050  | 0.013  | 1.61  | 0.80  | 0.008 | 0.003 | 0.001 | 0.004 | — | — | — |
| B8  | 0.046  | 0.045  | 1.88  | 0.76  | 0.009 | 0.002 | 0.001 | 0.002 | — | — | 0.01 |
| B9  | 0.060  | 0.097  | 1.85  | 0.37  | 0.014 | 0.004 | 0.001 | 0.003 | — | — | — |
| B10 | 0.059  | 0.120* | 1.65  | 0.61  | 0.008 | 0.004 | 0.002 | 0.002 | — | — | — |
| B11 | 0.063  | 0.019  | 0.30* | 0.36  | 0.010 | 0.002 | 0.002 | 0.003 | — | — | — |
| B12 | 0.042  | 0.048  | 0.81  | 0.99  | 0.013 | 0.005 | 0.001 | 0.002 | — | — | — |
| B13 | 0.069  | 0.047  | 1.30  | 0.89  | 0.006 | 0.004 | 0.003 | 0.001 | — | — | — |
| B14 | 0.045  | 0.036  | 2.83  | 0.41  | 0.014 | 0.002 | 0.002 | 0.004 | — | — | — |
| B15 | 0.059  | 0.050  | 4.21* | 1.00  | 0.018 | 0.002 | 0.001 | 0.002 | — | — | — |
| B16 | 0.050  | 0.050  | 1.55  | 0.05* | 0.007 | 0.002 | 0.002 | 0.003 | — | — | — |
| B17 | 0.076  | 0.033  | 1.76  | 0.21  | 0.009 | 0.003 | 0.002 | 0.002 | — | — | — |
| B18 | 0.076  | 0.034  | 1.98  | 0.70  | 0.009 | 0.004 | 0.001 | 0.000 | — | — | — |
| B19 | 0.063  | 0.048  | 1.72  | 2.10  | 0.008 | 0.002 | 0.003 | 0.001 | — | — | — |
| B20 | 0.058  | 0.025  | 1.55  | 3.20* | 0.005 | 0.004 | 0.002 | 0.003 | — | — | — |
| B21 | 0.046  | 0.016  | 1.77  | 0.40  | 0.008 | 0.002 | 0.001 | 0.004 | 0.05 | — | — |
| B22 | 0.058  | 0.021  | 1.86  | 0.66  | 0.005 | 0.004 | 0.003 | 0.002 | — | 0.06 | — |
| B23 | 0.070  | 0.025  | 1.75  | 0.36  | 0.014 | 0.004 | 0.001 | 0.003 | — | — | 0.06 |
| B24 | 0.043  | 0.030  | 1.92  | 0.74  | 0.019 | 0.003 | 0.003 | 0.002 | — | — | — |
| B25 | 0.066  | 0.015  | 1.63  | 0.98  | 0.007 | 0.003 | 0.003 | 0.005 | — | — | — |
| B26 | 0.077  | 0.042  | 1.30  | 0.36  | 0.011 | 0.002 | 0.002 | 0.004 | — | — | — |
| B27 | 0.057  | 0.049  | 1.21  | 0.34  | 0.012 | 0.005 | 0.003 | 0.001 | — | — | — |
| B28 | 0.042  | 0.033  | 1.53  | 0.44  | 0.014 | 0.002 | 0.002 | 0.002 | — | — | — |
| B29 | 0.053  | 0.023  | 1.69  | 0.75  | 0.006 | 0.003 | 0.002 | 0.005 | — | — | — |
| B30 | 0.058  | 0.026  | 1.50  | 0.94  | 0.009 | 0.002 | 0.002 | 0.002 | — | — | — |
| B31 | 0.055  | 0.015  | 2.0   | 0.75  | 0.009 | 0.003 | 0.002 | 0.003 | — | — | — |
| B32 | 0.044  | 0.042  | 1.7   | 0.35  | 0.017 | 0.002 | 0.001 | 0.005 | — | — | — |
| B33 | 0.051  | 0.016  | 1.3   | 0.63  | 0.005 | 0.003 | 0.002 | 0.001 | — | — | — |
| B34 | 0.068  | 0.017  | 1.3   | 0.76  | 0.007 | 0.003 | 0.002 | 0.002 | — | — | — |
| B35 | 0.045  | 0.025  | 1.7   | 0.82  | 0.019 | 0.002 | 0.002 | 0.004 | — | — | — |
| B36 | 0.074  | 0.015  | 1.9   | 0.36  | 0.006 | 0.004 | 0.001 | 0.002 | — | — | — |

The mark "*" indicates that the value fell out of the range defined in the present invention.

TABLE 7

| Steel No. | Chemical composition (mass %, balance: Fe and impurities) | | | | | | | | | | | |
|---|---|---|---|---|---|---|---|---|---|---|---|---|
| | Cu | Ni | Mo | Cr | B | Ca | Mg | Zr | REM | Sb | Sn | As |
| B1  | —    | — | — | —    | — | — | — | — | — | — | — | 0.001 |
| B2  | —    | — | — | 0.11 | — | — | — | — | — | — | — | 0.002 |
| B3  | —    | — | — | —    | — | — | — | — | — | — | — | 0.001 |
| B4  | 0.01 | — | — | —    | — | — | — | — | — | — | — | 0.002 |
| B5  | 0.01 | — | — | —    | — | — | — | — | — | — | — | 0.001 |
| B6  | 0.02 | — | — | —    | — | — | — | — | — | — | — | 0.003 |
| B7  | 0.01 | — | — | —    | — | — | — | — | — | — | — | 0.001 |
| B8  | 0.01 | — | — | —    | — | — | — | — | — | — | — | 0.001 |
| B9  | 0.02 | — | — | —    | — | — | — | — | — | — | — | 0.002 |
| B10 | 0.01 | — | — | —    | — | — | — | — | — | — | — | 0.001 |
| B11 | 0.01 | — | — | —    | — | — | — | — | — | — | — | 0.001 |
| B12 | 0.02 | — | — | —    | — | — | — | — | — | — | — | 0.001 |
| B13 | 0.01 | — | — | —    | — | — | — | — | — | — | — | — |
| B14 | 0.01 | — | — | —    | — | — | — | — | — | — | — | 0.003 |
| B15 | 0.02 | — | — | —    | — | — | — | — | — | — | — | 0.002 |
| B16 | 0.02 | — | — | —    | — | — | — | — | — | — | — | 0.001 |
| B17 | 0.01 | — | — | —    | — | — | — | — | — | — | — | 0.002 |

TABLE 7-continued

| Steel No. | Chemical composition (mass %, balance: Fe and impurities) | | | | | | | | | | | |
|---|---|---|---|---|---|---|---|---|---|---|---|---|
| | Cu | Ni | Mo | Cr | B | Ca | Mg | Zr | REM | Sb | Sn | As |
| B18 | 0.03 | — | — | — | — | — | — | — | — | — | — | 0.001 |
| B19 | 0.01 | — | — | — | — | — | — | — | — | — | — | 0.002 |
| B20 | 0.01 | — | — | — | — | — | — | — | — | — | — | 0.001 |
| B21 | 0.01 | — | — | — | — | — | — | — | — | — | — | — |
| B22 | 0.01 | — | — | — | — | — | — | — | — | — | — | — |
| B23 | 0.01 | — | — | — | — | — | — | — | — | — | — | 0.001 |
| B24 | 0.32 | — | — | — | — | — | — | — | — | — | — | 0.001 |
| B25 | 0.01 | 0.43 | — | — | — | — | — | — | — | — | — | 0.001 |
| B26 | 0.01 | — | 0.30 | — | — | — | — | — | — | — | — | 0.001 |
| B27 | 0.01 | — | — | 0.20 | — | — | — | — | — | — | — | 0.001 |
| B28 | 0.01 | — | — | — | — | — | — | — | — | — | — | 0.001 |
| B29 | 0.02 | — | — | — | — | — | — | — | — | — | — | 0.001 |
| B30 | 0.01 | — | — | — | — | — | 0.002 | — | — | — | — | 0.001 |
| B31 | — | — | — | — | 0.0015 | — | — | — | — | — | — | — |
| B32 | — | — | — | — | — | 0.008 | — | — | — | — | — | — |
| B33 | — | — | — | — | — | — | — | 0.030 | — | — | — | — |
| B34 | — | — | — | — | — | — | — | 0.040 | — | — | — | — |
| B35 | — | — | — | — | — | — | — | — | — | 0.070 | — | — |
| B36 | — | — | — | — | — | — | — | — | — | — | 0.090 | — |

TABLE 8

| No. | Steel No. | Process (1) Decrement (%) | Process (2a) Temp. (° C.) | Process (2a) Rolling Reduction (%) | Process (2b) Temp. (° C.) | Process (2b) Rolling Reduction (%) | Process (3a) Time From Finishing To Water Cooling (Sec) | Process (3b) Average Cooling Rate (° C./Sec) |
|---|---|---|---|---|---|---|---|---|
| 1 | B1 | 40 | 920 | 20 | 902 | 8 | 0.20 | 60 |
| 2 | B2 | 40 | 915 | 20 | 895 | 8 | 0.20 | 63 |
| 3 | B3 | 59 | 908 | 21 | 890 | 10 | 0.15 | 128 |
| 4 | B4 | 40 | 893 | 19 | 871 | 9 | 0.24 | 121 |
| 5 | B5 | 50 | 941 | 19 | 924 | 7 | 0.40 | 94 |
| 6 | B6 | 32 | 932 | 21 | 921 | 9 | 0.26 | 132 |
| 7 | B7 | 43 | 901 | 19 | 887 | 10 | 0.15 | 129 |
| 8 | B8 | 40 | 939 | 23 | 919 | 7 | 0.38 | 107 |
| 9 | B9 | 42 | 935 | 19 | 912 | 9 | 0.24 | 74 |
| 10 | B10 | 58 | 881 | 16 | 871 | 9 | 0.05 | 125 |
| 11 | B11 | 42 | 915 | 16 | 906 | 6 | 0.22 | 60 |
| 12 | B12 | 36 | 947 | 21 | 939 | 8 | 0.06 | 83 |
| 13 | B13 | 45 | 914 | 20 | 898 | 9 | 0.30 | 79 |
| 14 | B14 | 40 | 943 | 20 | 924 | 10 | 0.30 | 66 |
| 15 | B15 | 45 | 926 | 20 | 907 | 6 | 0.48 | 125 |
| 16 | B16 | 50 | 935 | 18 | 918 | 7 | 0.27 | 129 |
| 17 | B17 | 40 | 897 | 21 | 881 | 10 | 0.14 | 119 |
| 18 | B18 | 32 | 908 | 20 | 884 | 6 | 0.08 | 55 |
| 19 | B19 | 31 | 883 | 18 | 871 | 9 | 0.14 | 125 |
| 20 | B20 | 50 | 905 | 20 | 898 | 6 | 0.43 | 127 |
| 21 | B21 | 31 | 899 | 21 | 878 | 6 | 0.18 | 95 |
| 22 | B22 | 38 | 906 | 24 | 895 | 8 | 0.36 | 79 |
| 23 | B23 | 46 | 948 | 24 | 936 | 7 | 0.35 | 107 |
| 24 | B24 | 55 | 944 | 17 | 921 | 9 | 0.27 | 65 |
| 25 | B25 | 47 | 922 | 17 | 905 | 6 | 0.24 | 120 |
| 26 | B26 | 59 | 919 | 22 | 911 | 9 | 0.42 | 79 |
| 27 | B27 | 33 | 905 | 17 | 898 | 9 | 0.04 | 138 |
| 28 | B28 | 35 | 948 | 24 | 927 | 7 | 0.45 | 60 |
| 29 | B29 | 59 | 910 | 24 | 902 | 10 | 0.35 | 56 |
| 30 | B30 | 51 | 948 | 17 | 937 | 9 | 0.24 | 54 |
| 31 | B31 | 46 | 883 | 20 | 871 | 8 | 0.36 | 66 |
| 32 | B32 | 53 | 896 | 19 | 873 | 9 | 0.29 | 63 |
| 33 | B33 | 34 | 948 | 16 | 923 | 7 | 0.28 | 88 |
| 34 | B34 | 34 | 944 | 20 | 924 | 6 | 0.37 | 132 |
| 35 | B35 | 47 | 921 | 20 | 907 | 9 | 0.31 | 107 |
| 36 | B36 | 37 | 929 | 19 | 922 | 9 | 0.10 | 61 |
| 37 | B1 | 24# | 891 | 21 | 873 | 9 | 0.36 | 65 |
| 38 | B1 | 56 | 913 | 23 | 893 | 4# | 0.05 | 79 |
| 39 | B1 | 48 | 934 | 17 | 911 | 12# | 0.38 | 55 |
| 40 | B1 | 50 | 940 | 21 | 918 | 8 | 0.70# | 82 |
| 41 | B1 | 34 | 912 | 20 | 906 | 8 | 0.08 | 35# |
| 42 | B1 | 47 | 935 | 23 | 927 | 6 | 0.29 | 108 |
| 43 | B1 | 49 | 891 | 19 | 871 | 9 | 0.26 | 132 |

TABLE 8-continued

| No. | Steel No. | Process (1) Decrement (%) | Process (2a) Temp. (° C.) | Process (2a) Rolling Reduction (%) | Process (2b) Temp. (° C.) | Process (2b) Rolling Reduction (%) | Process (3a) Time From Finishing To Water Cooling (Sec) | Process (3b) Average Cooling Rate (° C./Sec) |
|---|---|---|---|---|---|---|---|---|
| 44 | B1 | 38 | 881 | 18 | 872 | 9 | 0.08 | 79 |
| 45 | B1 | 50 | 939 | 20 | 922 | 9 | 0.35 | 121 |
| 46 | B1 | 42 | 925 | 22 | 917 | 10 | 0.23 | 112 |
| 47 | B1 | 43 | 944 | 23 | 930 | 7 | 0.40 | 51 |
| 48 | B1 | 43 | 949 | 22 | 924 | 8 | 0.10 | 64 |
| 49 | B1 | 53 | 888 | 21 | 871 | 6 | 0.44 | 87 |
| 50 | B1 | 40 | 920 | 20 | 902 | 8 | 0.20 | 60 |
| 51 | B1 | 40 | 920 | 20 | 902 | 8 | 0.20 | 60 |

The mark "#" indicates that the value fell out of the recommended condition.

TABLE 9

| No. | Steel No. | Process (3c) Cooling Time (Sec) | Process (3d) Cooling Time (Sec) | Process (3e) Average Cooling Rate (° C./Sec) | Process (4) Coiling Temperature (° C.) | Plating Galvanizing | Plating Galvannealing | Sheet Thickness (mm) |
|---|---|---|---|---|---|---|---|---|
| 1 | B1 | 4.5 | 3.0 | 70 | 40 | No | No | 3.0 |
| 2 | B2 | 5.0 | 1.0# | 70 | 43 | No | No | 3.0 |
| 3 | B3 | 2.9 | 2.8 | 93 | 390 | No | No | 2.1 |
| 4 | B4 | 3.9 | 3.8 | 64 | 238 | No | No | 2.1 |
| 5 | B5 | 4.0 | 3.8 | 52 | 315 | No | No | 2.5 |
| 6 | B6 | 4.4 | 2.4 | 77 | 161 | No | No | 2.1 |
| 7 | B7 | 3.2 | 4.1 | 59 | 103 | No | No | 2.5 |
| 8 | B8 | 4.3 | 5.4 | 83 | 71 | No | No | 2.4 |
| 9 | B9 | 4.8 | 2.6 | 86 | 102 | No | No | 2.0 |
| 10 | B10 | 4.5 | 5.9 | 75 | 270 | No | No | 2.0 |
| 11 | B11 | 4.6 | 2.9 | 95 | 194 | No | No | 2.4 |
| 12 | B12 | 4.1 | 3.8 | 68 | 370 | No | No | 2.3 |
| 13 | B13 | 4.9 | 4.3 | 76 | 104 | No | No | 2.5 |
| 14 | B14 | 2.6 | 5.0 | 56 | 273 | No | No | 2.4 |
| 15 | B15 | 2.6 | 5.1 | 99 | 329 | No | No | 2.2 |
| 16 | B16 | 2.3 | 4.5 | 90 | 191 | No | No | 2.4 |
| 17 | B17 | 3.6 | 3.8 | 70 | 157 | No | No | 2.4 |
| 18 | B18 | 2.1 | 3.6 | 78 | 304 | No | No | 2.4 |
| 19 | B19 | 4.0 | 5.9 | 71 | 379 | No | No | 2.1 |
| 20 | B20 | 2.3 | 4.7 | 97 | 284 | No | No | 2.4 |
| 21 | B21 | 2.1 | 5.3 | 99 | 158 | No | No | 2.4 |
| 22 | B22 | 2.5 | 4.3 | 73 | 65 | No | No | 2.3 |
| 23 | B23 | 2.3 | 2.5 | 69 | 191 | No | No | 2.2 |
| 24 | B24 | 3.5 | 4.7 | 95 | 186 | No | No | 2.5 |
| 25 | B25 | 4.3 | 2.4 | 51 | 95 | No | No | 2.5 |
| 26 | B26 | 4.9 | 5.3 | 58 | 141 | No | No | 2.2 |
| 27 | B27 | 3.0 | 5.6 | 51 | 204 | No | No | 2.0 |
| 28 | B28 | 2.1 | 4.3 | 52 | 301 | No | No | 2.4 |
| 29 | B29 | 3.0 | 3.0 | 70 | 211 | No | No | 2.5 |
| 30 | B30 | 3.1 | 2.1 | 85 | 35 | No | No | 2.0 |
| 31 | B31 | 4.8 | 4.5 | 84 | 132 | No | No | 2.5 |
| 32 | B32 | 2.9 | 5.1 | 59 | 326 | No | No | 2.4 |
| 33 | B33 | 3.7 | 4.7 | 76 | 309 | No | No | 2.5 |
| 34 | B34 | 3.2 | 5.1 | 54 | 129 | No | No | 2.1 |
| 35 | B35 | 3.1 | 2.3 | 52 | 267 | No | No | 2.5 |
| 36 | B36 | 3.4 | 4.8 | 72 | 385 | No | No | 2.1 |
| 37 | B1 | 4.4 | 5.6 | 62 | 324 | No | No | 2.5 |
| 38 | B1 | 3.1 | 4.8 | 58 | 87 | No | No | 2.4 |
| 39 | B1 | 4.7 | 2.6 | 78 | 230 | No | No | 2.3 |
| 40 | B1 | 2.7 | 3.0 | 64 | 295 | No | No | 2.5 |
| 41 | B1 | 3.4 | 2.9 | 58 | 37 | No | No | 2.2 |
| 42 | B1 | 1.0# | 2.2 | 81 | 223 | No | No | 2.4 |
| 43 | B1 | 3.1 | 0.8# | 76 | 216 | No | No | 2.4 |

TABLE 9-continued

| Steel No. | Steel No. | Process (3c) Cooling Time (Sec) | Process (3d) Cooling Time (Sec) | Process (3e) Average Cooling Rate (° C./Sec) | Process (4) Coiling Temperature (° C.) | Plating Galvanizing | Plating Galvannealing | Sheet Thickness (mm) |
|---|---|---|---|---|---|---|---|---|
| 44 | B1 | 3.4 | 6.8# | 55 | 113 | No | No | 2.0 |
| 45 | B1 | 2.8 | 5.9 | 39# | 354 | No | No | 2.4 |
| 46 | B1 | 2.6 | 5.9 | 55 | 417# | No | No | 2.4 |
| 47 | B1 | 4.0 | 4.2 | 91 | 360 | Yes | No | 2.4 |
| 48 | B1 | 4.2 | 2.7 | 58 | 113 | Yes | No | 2.3 |
| 49 | B1 | 2.5 | 5.7 | 80 | 94 | Yes | Yes | 2.1 |
| 50 | B1 | 4.9 | 1.7# | 70 | 40 | No | No | 3.0 |
| 51 | B1 | 4.9 | 7.1# | 70 | 40 | No | No | 3.0 |

The mark "#" indicates that the value fell out of the recommended condition.

In Table 8 and Table 9, PROCESS (1) means the machining performed before the rough rolling process and shows, in the tables, its decrements ΔW (%) in length of the slabs in the width direction. PROCESS (2a) and PROCESS (2b) means the rolling in one pass before the finished rolling and the finished rolling, respectively, and show, in the tables, their temperatures (° C.) and their rolling reductions (%). PROCESS (3a) refers to retention performed from the end of the finish rolling until the start of the water cooling and shows, in the tables, its retention times. PROCESS (3b) refers to the cooling process for the temperature range of 870 to 720° C. and shows, in the tables, its average cooling rates (° C./sec) in the temperature range. PROCESS (3c) refers to the cooling process for the temperature range of 720° C. or less and more than 630° C. and shows, in the tables, its cooling times (sec) in the temperature range. PROCESS (3d) refers to the cooling process for the temperature range of 630° C. or less and more than 600° C. and shows, in the tables, its cooling times (sec) in the temperature range. PROCESS (3e) refers to the cooling process for the temperature range of 600° C. or less and more than to 450° C. and shows, in the tables, its average cooling rates (° C./sec) in the temperature range. PROCESS (4) refers to the coiling process and shows, in the tables, its coiling temperatures (° C.).

On the obtained steel sheets, their steel micro-structures, mechanical properties, and hole-expansion properties were measured.

<Measurement of Steel Micro-Structure>

On a rolling-direction perpendicular cross section that lies at a ¼ depth position of a sheet thickness t (¼t area) from a steel sheet surface, the EBSD analysis is performed on a zone that is 200 μm long in a rolling direction and 100 μm long in a rolling-surface normal direction at a measurement interval of 0.2 μm, so as to obtain crystal orientation information. The EBSD analysis is here performed using an apparatus including a thermal field emission scanning electron microscope (JSM-7001F from JEOL) and an EBSD detector (DVC5-type detector from TSL solutions) and involves measurement with an exposure time of 60 msec, using "TSL OIM Data Collection 6" that comes with an EBSD analyzer. Next, in the obtained crystal orientation information, a zone having a crystal misorientation of 5° or more is defined as a grain, an average crystal misorientation of the grain is calculated, and proportions of grains having the average crystal misorientations of less than 0.5° or 0.5 to 1.00 are calculated.

The "average crystal misorientation of a grain" in the present invention is an average value of "Grain Average Misorientations (GAM)," each of which is an orientation spread of the grain, and is obtained by calculating misorientations between neighboring measurement points and calculating an average value of the misorientations for every measurement point in the grain. Values of the GAM were calculated with "OIM Analysis® Version 7.0.1," a piece of software coming with an EBSD analyzer.

An "average value of Image Qualities in a grain" in the present invention actually means an average value of values obtained by analyzing, by the Grain average image quality (GAIQ) method, measurement values from measurement by the EBSD method.

In the GAIQ, on an assumption that a zone having a crystal misorientation of 5° or more is defined as a grain in crystal orientation information obtained by the EBSD analysis, a proportion of grains having an in-grain average dislocation density of less than 4000 is calculated. The values of the GAIQ can be calculated with "OIM Analysis® Version 7.0.1," a piece of software coming with an EBSD analyzer.

Based on the K value and the Y value obtained in the manner described above, metallic phases were classified as follows.

Metallic phase 1: a metallic phase having a K value of less than 4.000

Metallic phase 2: a metallic phase having a K value of 4.000 or more and a Y value of 0.5 to 1.0

Metallic phase 3: a metallic phase having a K value of 4.000 or more and a Y value of less than 0.5

Metallic phase 4: a metallic phase falling under none of metallic phases 1 to 3

<Measurement of Mechanical Properties>

The tensile strength and the elongation are evaluated in such a manner that a JIS No. 5 specimen is taken in a direction perpendicular to a rolling direction of a steel sheet and a tensile test is performed in conformity with JIS Z 2242 to measure a tensile strength (TS) and a total elongation (El).

<Hole-Expansion Property>

The hole-expansion property is evaluated in such a manner that a hole expansion test is performed in conformity with JFS-T1001-1996 of The Japan Iron and Steel Federation Standard to measure a hole expansion rate (HER).

Results of the above are shown in Table 10.

TABLE 10

| No. | Steel No. | Steel Micro-Structure (Area %) | | | | Proportion Of Boundary Between Metallic Phase 1 And Metallic Phase 2 (%) | Mechanical Properties | | |
|---|---|---|---|---|---|---|---|---|---|
| | | Metallic Phase 1 | Metallic Phase 2 | Metallic Phase 3 | Metallic Phase 4 | | TS (MPa) | λ (%) | EL (%) |
| 1 | B1 | 8.0 | 75.0 | 17.0 | 0.0 | 94 | 788 | 97.0 | 23.0 |
| 2 | B2 | 5.0 | 10.0* | 18.0 | 67.0* | 14** | 798 | 91.0 | 22.1 |
| 3 | B3 | 4.1 | 65.2 | 30.7 | 0.0 | 92 | 785 | 97.5 | 26.1 |
| 4 | B4 | 8.7 | 74.6 | 16.7 | 0.0 | 96 | 790 | 97.7 | 24.6 |
| 5 | B5 | 32.4 | 54.4 | 13.2 | 0.0 | 67 | 897 | 98.3 | 26.5 |
| 6 | B6 | 0.0* | 60.3 | 8.5 | 31.2* | 0** | 949 | 44.0 | 25.0 |
| 7 | B7 | 32.0 | 54.7 | 13.3 | 0.0 | 62 | 908 | 96.3 | 24.7 |
| 8 | B8 | 8.6 | 74.7 | 16.7 | 0.0 | 91 | 800 | 98.1 | 25.3 |
| 9 | B9 | 3.2 | 66.2 | 30.6 | 0.0 | 93 | 785 | 96.4 | 24.7 |
| 10 | B10 | 0.0* | 44.7 | 55.3* | 0.0 | 0** | 523 | 98.9 | 26.9 |
| 11 | B11 | 0.0* | 45.8 | 54.2* | 0.0 | 0** | 524 | 98.7 | 26.8 |
| 12 | B12 | 3.9 | 65.5 | 30.6 | 0.0 | 87 | 785 | 99.5 | 24.7 |
| 13 | B13 | 7.2 | 76.5 | 16.3 | 0.0 | 93 | 795 | 95.9 | 24.8 |
| 14 | B14 | 31.4 | 55.1 | 13.5 | 0.0 | 63 | 905 | 95.6 | 22.6 |
| 15 | B15 | 0.0* | 60.9 | 7.1 | 32.0* | 4** | 969 | 44.2 | 25.4 |
| 16 | B16 | 32.8 | 65.9 | 1.3* | 0.0 | 69 | 978 | 95.1 | 19.6 |
| 17 | B17 | 32.5 | 54.3 | 13.2 | 0.0 | 65 | 907 | 97.9 | 25.5 |
| 18 | B18 | 8.7 | 74.7 | 16.6 | 0.0 | 92 | 793 | 97.3 | 26.1 |
| 19 | B19 | 3.8 | 65.2 | 31.0 | 0.0 | 86 | 787 | 99.1 | 23.7 |
| 20 | B20 | 0.0* | 44.3 | 55.7* | 0.0 | 0** | 518 | 98.8 | 26.5 |
| 21 | B21 | 8.3 | 74.9 | 16.8 | 0.0 | 90 | 796 | 96.9 | 26.4 |
| 22 | B22 | 8.8 | 73.8 | 17.4 | 0.0 | 92 | 791 | 98.3 | 26.2 |
| 23 | B23 | 8.6 | 74.7 | 16.7 | 0.0 | 97 | 794 | 96.9 | 25.8 |
| 24 | B24 | 32.8 | 54.9 | 12.3 | 0.0 | 68 | 897 | 97.9 | 25.4 |
| 25 | B25 | 31.9 | 54.9 | 13.2 | 0.0 | 66 | 910 | 98.3 | 25.9 |
| 26 | B26 | 6.3 | 70.4 | 21.3 | 2.0 | 98 | 794 | 98.4 | 26.4 |
| 27 | B27 | 6.1 | 69.4 | 21.0 | 3.5 | 95 | 801 | 97.8 | 25.5 |
| 28 | B28 | 12.7 | 73.4 | 13.9 | 0.0 | 67 | 804 | 97.4 | 25.6 |
| 29 | B29 | 8.5 | 74.2 | 17.3 | 0.0 | 92 | 799 | 98.4 | 26.3 |
| 30 | B30 | 7.7 | 75.9 | 16.4 | 0.0 | 91 | 799 | 97.2 | 25.4 |
| 31 | B31 | 16.0 | 74.5 | 9.5 | 0.0 | 62 | 920.0 | 96.2 | 20.9 |
| 32 | B32 | 7.7 | 75.2 | 17.1 | 0.0 | 91 | 792.0 | 97.5 | 21.6 |
| 33 | B33 | 7.6 | 74.6 | 17.8 | 0.0 | 95 | 790.0 | 95.0 | 22 |
| 34 | B34 | 7.8 | 75.7 | 16.5 | 0.0 | 96 | 792.0 | 96.4 | 22.1 |
| 35 | B35 | 7.9 | 74.9 | 17.2 | 0.0 | 95 | 792.0 | 96.6 | 20.3 |
| 36 | B36 | 7.8 | 75.1 | 17.1 | 0.0 | 96 | 793.0 | 95.1 | 19.9 |
| 37 | B1 | 6.7 | 5.0* | 16.7 | 71.6* | 9** | 797 | 91.0 | 22.1 |
| 38 | B1 | 5.2 | 4.1* | 16.2 | 74.5* | 7** | 794 | 91.2 | 22.3 |
| 39 | B1 | 6.3 | 5.1* | 17.3 | 71.3* | 11** | 790 | 91.4 | 22.4 |
| 40 | B1 | 20.6 | 77.3 | 2.1* | 0.0 | 66 | 897 | 95.1 | 19.5 |
| 41 | B1 | 21.3 | 77.2 | 1.5* | 0.0 | 63 | 893 | 95.4 | 17.9 |
| 42 | B1 | 32.8 | 65.1 | 2.1* | 0.0 | 72 | 978 | 95.2 | 19.3 |
| 43 | B1 | 4.7 | 9.7* | 18.5 | 67.1* | 13** | 812 | 91.0 | 22.1 |
| 44 | B1 | 4.1 | 9.4* | 17.3 | 69.2* | 16** | 812 | 90.4 | 22.4 |
| 45 | B1 | 4.7 | 9.3* | 17.9 | 68.1* | 17** | 800 | 90.9 | 22.2 |
| 46 | B1 | 0.0* | 75.4 | 17.2 | 7.4* | 0** | 804 | 90.1 | 22.4 |
| 47 | B1 | 8.0 | 75.0 | 17.0 | 0.0 | 93 | 801 | 97.0 | 23.0 |
| 48 | B1 | 6.9 | 75.1 | 16.9 | 1.1 | 94 | 800 | 95.7 | 23.1 |
| 49 | B1 | 7.2 | 73.8 | 17.7 | 1.3 | 93 | 794 | 95.1 | 22.4 |
| 50 | B1 | 33.6 | 27.5* | 34.4 | 4.5 | 43** | 799 | 57.8 | 23.0 |
| 51 | B1 | 0.4* | 65.2 | 34.4 | 0.0 | 98 | 549 | 98.6 | 26.7 |

The mark "*" indicates that the value fell out of the range defined in the present invention.

The mark "**" indicates that the value fell out of the preferable range in the present invention.

As shown in Table 10, inventive examples of the present invention have tensile strengths of 780 MPa or more and sufficient hole-expansion properties.

INDUSTRIAL APPLICABILITY

According to the present invention, a steel sheet and a plated steel sheet that has a strength as high as 590 MPa or more (furthermore, 780 MPa or more) in terms of tensile strength and has an excellent hole-expansion property are provided.

REFERENCE SIGNS LIST

1 Crystal structure having a K value of less than 4
2 Crystal structure having a K value of 4 or more and a Y value of 0.5 to 1.0
3 Crystal structure having a K value of 4 or more and a Y value of less than 0.5

The invention claimed is:

1. A steel sheet comprising
a chemical composition consisting of, in mass percent:
C: 0.01 to 0.20%;
Si: 0.005 to 0.10%;
Mn: 0.60 to 4.00%;
Al: 0.55 to 3.00%;
P: 0.10% or less;
S: 0.03% or less;
N: 0.01% or less;
O: 0.01% or less;
Ti: 0 to 2.00%;
Nb: 0 to 2.00%;
V: 0 to 0.30%;
Cu: 0 to 2.00%;
Ni: 0 to 2.00%;
Mo: 0 to 1.00%;
Cr: 0 to 2.00%;
B: 0 to 0.01%;
Ca: 0 to 0.010%;
Mg: 0 to 0.010%;
Zr: 0 to 0.050%;
REM: 0 to 0.1%;
Sb: 0 to 0.10%;
Sn: 0 to 0.10%; and
As: 0 to 0.5%,
with the balance: Fe and impurities, and comprising
a microstructure that includes,
when a zone surrounded by a grain boundary that is measured to be 5.0° or more by an EBSD analysis is assumed to be a grain, and when
a K value is a value obtained by multiplying an average value of Image Qualities in a grain by $10^{-3}$,
a Y value is an average crystal misorientation (°) in the grain,
a metallic phase 1 is a metallic phase the K value of which is less than 4.000,
a metallic phase 2 is a metallic phase the K value of which is 4.000 or more and the Y value of which is 0.5 to 1.0,
a metallic phase 3 is a metallic phase the K value of which is 4.000 or more and the Y value of which is less than 0.5, and
a metallic phase 4 is a metallic phase that falls under none of metallic phases 1 to 3, and the metallic phase 4 comprises at least one of upper bainite, lower bainite, in area percent:
the metallic phase 1: 1.0% or more and less than 35.0%;
the metallic phase 2: 30.0% or more and 80.0% or less;
the metallic phase 3: 5.0% or more and 50.0% or less; and
the metallic phase 4: 5.0% or less.

2. The steel sheet according to claim 1, comprising a microstructure in which the metallic phase 4 is 0%.

3. The steel sheet according to claim 1, wherein 60.0% or more of boundaries of the metallic phase 1 with other metallic phases is a boundary of the metallic phase 1 with the metallic phase 2.

4. The steel sheet according to claim 3, wherein a thickness of the steel sheet is 0.8 to 3.6 mm.

5. The steel sheet according to claim 4, wherein
the steel sheet has a tensile strength of 780 MPa or more, and comprises a microstructure including, in area percent:
the metallic phase 1: 1.0% or more and less than 35.0%;
the metallic phase 2: 30.0% or more and 80.0% or less;
the metallic phase 3: 5.0% or more and less than 35.0%; and
the metallic phase 4: 5.0% or less.

6. The steel sheet according to claim 4, wherein
the steel sheet has a tensile strength of 590 MPa or more and less than 780 MPa, and comprises a microstructure including:
the metallic phase 1: 1.0% or more and less than 30.0%;
the metallic phase 2: 35.0% or more and 70.0% or less;
the metallic phase 3: 35.0% or more and 50.0% or less; and
the metallic phase 4: 5.0% or less.

7. The steel sheet according to claim 3, wherein
the steel sheet has a tensile strength of 780 MPa or more, and comprises a microstructure including, in area percent:
the metallic phase 1: 1.0% or more and less than 35.0%;
the metallic phase 2: 30.0% or more and 80.0% or less;
the metallic phase 3: 5.0% or more and less than 35.0%; and
the metallic phase 4: 5.0% or less.

8. The steel sheet according to claim 3, wherein
the steel sheet has a tensile strength of 590 MPa or more and less than 780 MPa, and comprises a microstructure including:
the metallic phase 1: 1.0% or more and less than 30.0%;
the metallic phase 2: 35.0% or more and 70.0% or less;
the metallic phase 3: 35.0% or more and 50.0% or less; and
the metallic phase 4: 5.0% or less.

9. The steel sheet according to claim 1, wherein a thickness of the steel sheet is 0.8 to 3.6 mm.

10. The steel sheet according to claim 9, wherein
the steel sheet has a tensile strength of 780 MPa or more, and comprises a microstructure including, in area percent:
the metallic phase 1: 1.0% or more and less than 35.0%;
the metallic phase 2: 30.0% or more and 80.0% or less;
the metallic phase 3: 5.0% or more and less than 35.0%; and
the metallic phase 4: 5.0% or less.

11. The steel sheet according to claim 9, wherein
the steel sheet has a tensile strength of 590 MPa or more and less than 780 MPa, and comprises a microstructure including:
the metallic phase 1: 1.0% or more and less than 30.0%;
the metallic phase 2: 35.0% or more and 70.0% or less;

the metallic phase 3: 35.0% or more and 50.0% or less; and the metallic phase 4: 5.0% or less.

12. The steel sheet according to claim 1, wherein
the steel sheet has a tensile strength of 780 MPa or more, and comprises a microstructure including, in area percent:
the metallic phase 1: 1.0% or more and less than 35.0%;
the metallic phase 2: 30.0% or more and 80.0% or less;
the metallic phase 3: 5.0% or more and less than 35.0%; and
the metallic phase 4: 5.0% or less.

13. The steel sheet according to claim 1, wherein
the steel sheet has a tensile strength of 590 MPa or more and less than 780 MPa, and comprises a microstructure including:
the metallic phase 1: 1.0% or more and less than 30.0%;
the metallic phase 2: 35.0% or more and 70.0% or less;
the metallic phase 3: 35.0% or more and 50.0% or less; and
the metallic phase 4: 5.0% or less.

14. A plated steel sheet comprising a galvanized layer on a surface of the steel sheet according to claim 1.

15. A plated steel sheet comprising a galvannealed layer on a surface of the steel sheet according to claim 1.

16. A steel sheet comprising
a chemical composition comprising, in mass percent:
C: 0.01 to 0.20%;
Si: 0.005 to 0.10%;
Mn: 0.60 to 4.00%;
Al: 0.55 to 3.00%;
P: 0.10% or less;
S: 0.03% or less;
N: 0.01% or less;
O: 0.01% or less;
Ti: 0 to 2.00%;
Nb: 0 to 2.00%;
V: 0 to 0.30%;
Cu: 0 to 2.00%;
Ni: 0 to 2.00%;
Mo: 0 to 1.00%;
Cr: 0 to 2.00%;
B: 0 to 0.01%;
Ca: 0 to 0.010%;
Mg: 0 to 0.010%;
Zr: 0 to 0.050%;
REM: 0 to 0.1%;
Sb: 0 to 0.10%;
Sn: 0 to 0.10%; and
As: 0 to 0.5%,
with the balance: Fe and impurities, and comprising
a microstructure that includes,
when a zone surrounded by a grain boundary that is measured to be 5.0° or more by an EBSD analysis is assumed to be a grain, and when
a K value is a value obtained by multiplying an average value of Image Qualities in a grain by $10^{-3}$,
a Y value is an average crystal misorientation (°) in the grain,
a metallic phase 1 is a metallic phase the K value of which is less than 4.000,
a metallic phase 2 is a metallic phase the K value of which is 4.000 or more and the Y value of which is 0.5 to 1.0,
a metallic phase 3 is a metallic phase the K value of which is 4.000 or more and the Y value of which is less than 0.5, and
a metallic phase 4 is a metallic phase that falls under none of metallic phases 1 to 3, and the metallic phase 4 comprises at least one of upper bainite, lower bainite, in area percent:
the metallic phase 1: 1.0% or more and less than 35.0%;
the metallic phase 2: 30.0% or more and 80.0% or less;
the metallic phase 3: 5.0% or more and 50.0% or less; and
the metallic phase 4: 5.0% or less.

17. The steel sheet according to claim 16, comprising a microstructure in which the metallic phase 4 is 0%.

18. The steel sheet according to claim 16, wherein
60.0% or more of boundaries of the metallic phase 1 with other metallic phases is a boundary of the metallic phase 1 with the metallic phase 2.

19. The steel sheet according to claim 16, wherein a thickness of the steel sheet is 0.8 to 3.6 mm.

* * * * *